(12) United States Patent
Boatman et al.

(10) Patent No.: US 7,785,696 B2
(45) Date of Patent: Aug. 31, 2010

(54) EMBOSSED PRODUCT INCLUDING DISCRETE AND LINEAR EMBOSSMENTS

(75) Inventors: Donn Nathan Boatman, Union, KY (US); Kevin Benson McNeil, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 943 days.

(21) Appl. No.: 11/147,774

(22) Filed: Jun. 8, 2005

(65) Prior Publication Data

US 2006/0280910 A1 Dec. 14, 2006

(51) Int. Cl.
*B31F 1/12* (2006.01)
*D21H 27/40* (2006.01)
*B32B 3/00* (2006.01)

(52) U.S. Cl. .................... 428/156; 428/153; 428/154; 428/172

(58) Field of Classification Search ............... 428/153, 428/154, 172, 156
See application file for complete search history.

(56) References Cited

U.S. PATENT DOCUMENTS

| | | | |
|---|---|---|---|
| 496,964 A | 5/1893 | Wheeler | |
| 497,421 A | 5/1893 | Wheeler | |
| 3,414,459 A | 12/1968 | Wells | |
| 3,556,907 A | 1/1971 | Nystrand | |
| 3,615,076 A | 10/1971 | Stoker | |
| 3,672,950 A | 6/1972 | Murphy et al. | |
| 4,207,143 A | 6/1980 | Glomb et al. | |
| 4,284,465 A | 8/1981 | Walbrun | |
| 4,307,141 A | 12/1981 | Walbrun | |
| 4,320,162 A | 3/1982 | Schulz | |
| 4,326,002 A | 4/1982 | Schulz | |
| 4,483,728 A | 11/1984 | Bauernfeind | |
| 4,659,608 A | 4/1987 | Schulz | |
| 4,921,034 A | 5/1990 | Burgess et al. | |
| 4,994,144 A | 2/1991 | Smith et al. | |
| D319,349 S | 8/1991 | Schultz et al. | |
| 5,294,475 A | 3/1994 | McNeil | |
| 5,300,347 A | 4/1994 | Underhill et al. | |
| 5,356,506 A | 10/1994 | McNeil et al. | |
| 5,409,572 A | 4/1995 | Kershaw et al. | |
| 5,436,057 A | 7/1995 | Schulz | |
| 5,468,323 A | 11/1995 | McNeil | |
| 5,573,830 A | 11/1996 | Schulz | |
| 5,597,639 A | 1/1997 | Schulz | |
| 5,620,776 A | 4/1997 | Schulz | |
| 5,686,168 A | 11/1997 | Laurent et al. | |
| 5,693,403 A | 12/1997 | Brown et al. | |

(Continued)

FOREIGN PATENT DOCUMENTS

EP 0 265 298 B1 4/1991

(Continued)

*Primary Examiner*—David R Sample
*Assistant Examiner*—Catherine Simone
(74) *Attorney, Agent, or Firm*—Betty J. Zea; David M. Weirich

(57) ABSTRACT

A web product including one or more plies, the web product having a first side and a second side, the web product including a plurality of discrete embossments extending from the first side to the second side; and at least one linear embossment extending from the second side to the first side, wherein the web product has an average embossment height of greater than about 650 μm.

21 Claims, 10 Drawing Sheets

U.S. PATENT DOCUMENTS

| | | | |
|---|---|---|---|
| 5,779,965 | A | 7/1998 | Beuther et al. |
| D405,269 | S | 2/1999 | Schulz |
| 5,874,156 | A | 2/1999 | Schulz |
| D408,162 | S | 4/1999 | Wilhelm et al. |
| D420,517 | S | 2/2000 | Guillot et al. |
| 6,074,525 | A | 6/2000 | Richards |
| 6,077,590 | A | 6/2000 | Archer et al. |
| 6,086,715 | A | 7/2000 | McNeil |
| 6,106,928 | A | 8/2000 | Laurent et al. |
| 6,113,723 | A | 9/2000 | McNeil et al. |
| 6,153,053 | A | 11/2000 | Harper et al. |
| 6,165,319 | A | 12/2000 | Heath et al. |
| 6,277,466 | B1 | 8/2001 | McNeil et al. |
| 6,280,570 | B1 | 8/2001 | Harper et al. |
| 6,287,422 | B1 | 9/2001 | Harper et al. |
| 6,287,425 | B1 | 9/2001 | Richards |
| 6,299,729 | B1 | 10/2001 | Heath et al. |
| 6,331,228 | B1 | 12/2001 | Heath et al. |
| 6,344,111 | B1 | 2/2002 | Wilhelm |
| 6,361,308 | B2 | 3/2002 | Wendler, Jr. |
| 6,368,454 | B1 * | 4/2002 | Dwiggins et al. ............ 162/117 |
| 6,372,087 | B2 | 4/2002 | Harper et al. |
| 6,413,614 | B1 | 7/2002 | Giesler, Sr. et al. |
| 6,454,905 | B1 | 9/2002 | Hollmark et al. |
| 6,517,673 | B1 | 2/2003 | Heath et al. |
| 6,602,577 | B1 * | 8/2003 | Ostendorf et al. ............ 428/156 |
| 6,699,360 | B2 | 3/2004 | Heath et al. |
| D490,985 | S | 6/2004 | Ninmer |
| D490,986 | S | 6/2004 | Ninmer |
| 6,746,570 | B2 | 6/2004 | Burazin et al. |
| 6,787,000 | B2 | 9/2004 | Burazin et al. |
| 6,790,314 | B2 | 9/2004 | Burazin et al. |
| D497,054 | S | 10/2004 | Ninmer |
| 6,802,937 | B2 | 10/2004 | Johnston et al. |
| 6,846,172 | B2 | 1/2005 | Vaughn et al. |
| 2003/0111169 | A1 | 6/2003 | Baggot et al. |
| 2004/0231813 | A1 | 11/2004 | Basler et al. |
| 2005/0045292 | A1 | 3/2005 | Lindsay et al. |

FOREIGN PATENT DOCUMENTS

| | | | |
|---|---|---|---|
| EP | 0 909 357 | B1 | 9/2000 |
| EP | 1 527 898 | A1 | 5/2005 |
| WO | WO 94/06623 | | 3/1994 |
| WO | WO 03/104552 | | 12/2003 |

* cited by examiner

EMBOSSED PRODUCT INCLUDING DISCRETE AND LINEAR EMBOSSMENTS

FIELD OF THE INVENTION

The present invention relates to an improved embossed web product including discrete and linear embossments.

BACKGROUND OF THE INVENTION

The embossing of webs, such as paper webs, is well known in the art. Embossing of webs can provide improvements to the web such as increased bulk, improved water holding capacity, improved aesthetics and other benefits. Both single ply and multiple ply (or multi-ply) webs are known in the art and can be embossed. Multi-ply paper webs are webs that include at least two plies superimposed in face-to-face relationship to form a laminate.

During a typical embossing process, a web is fed through a nip formed between juxtaposed generally axially parallel rolls. Embossing elements on the rolls compress and/or deform the web. If a multi-ply product is being formed, two or more plies are fed through the nip and regions of each ply are brought into a contacting relationship with the opposing ply. The embossed regions of the plies may produce an aesthetic pattern and provide a means for joining and maintaining the plies in face-to-face contacting relationship.

Embossing is typically performed by one of two processes; knob-to-knob embossing or nested embossing. Knob-to-knob embossing typically consists of generally axially parallel rolls juxtaposed to form a nip between the embossing elements on opposing rolls. Nested embossing typically consists of embossing elements of one roll meshed between the embossing elements of the other roll. Examples of knob-to-knob embossing and nested embossing are illustrated in the prior art by U.S. Pat. No. 3,414,459 issued Dec. 3, 1968 to Wells; U.S. Pat. No. 3,547,723 issued Dec. 15, 1970 to Gresham; U.S. Pat. No. 3,556,907 issued Jan. 19, 1971 to Nystrand; U.S. Pat. No. 3,708,366 issued Jan. 2, 1973 to Donnelly; U.S. Pat. No. 3,738,905 issued Jun. 12, 1973 to Thomas; U.S. Pat. No. 3,867,225 issued Feb. 18, 1975 to Nystrand; U.S. Pat. No. 4,483,728 issued Nov. 20, 1984 to Bauernfeind; U.S. Pat. No. 5,468,323 issued Nov. 21, 1995 to McNeil; U.S. Pat. No. 6,086,715 issued Jun. 11, 2000 to McNeil; U.S. Pat. No. 6,277,466 Aug. 21, 2001; U.S. Pat. No. 6,395,133 issued May 28, 2002 and U.S. Pat. No. 6,846,172 B2 issued to Vaughn et al. on Jan. 25, 2005.

Knob-to-knob embossing generally produces a web comprising pillowed regions which can enhance the thickness of the product. However, the pillows have a tendency to collapse under pressure due to lack of support. Consequently, the thickness benefit is typically lost during the balance of the converting operation and subsequent packaging, diminishing the quilted appearance and/or thickness benefit sought by the embossing.

Nested embossing has proven in some cases to be a more desirable process for producing products exhibiting a softer, more quilted appearance that can be maintained throughout the balance of the converting process, including packaging. With nested embossing of a multi-ply product, one ply has a male pattern, while the other ply has a female pattern. As the two plies travel through the nip of the embossing rolls, the patterns are meshed together. Nested embossing aligns the knob crests on the male embossing roll with the low areas on the female embossing roll. As a result, the embossed sites produced on one ply provide support for the embossed sites on the other ply.

Another type of embossing, deep-nested embossing, has been developed and used to provide unique characteristics to the embossed web. Deep-nested embossing refers to embossing that utilizes paired emboss elements, wherein the protrusions from the different embossing elements are coordinated such that the protrusions of one embossing element fit into the space between the protrusions of the other embossing element. Although many deep-nested embossing processes are configured such that the embossing elements of the opposing embossing members do not touch each other or the surface of the opposing embossing member, embodiments are contemplated wherein the deep-nested embossing process includes tolerance such that the embossing elements touch each other or the surface of the opposing embossing member when engaged. (Of course, in the actual process, the embossing members generally do not touch each other or the opposing embossing member because the web is disposed between the embossing members.) Exemplary deep-nested embossing techniques are described in U.S. Pat. No. 5,686,168 issued to Laurent et al. on Nov. 11, 1997; U.S. Pat. No. 5,294,475 issued to McNeil on Mar. 15, 1994; U.S. patent application Ser. No. 11/059,986; U.S. patent application Ser. No. 10/700,131 and U.S. Patent Provisional Application Ser. No. 60/573,727.

While these deep-nesting technologies have been useful, it has been observed that when producing certain deep-nested embossed patterns, the resulting web can lose some of its strength and/or softness due to the embossing process. Also, some deep-nested embossing patterns can substantially weaken the web or even tear it while the web is being embossed. Further, the deep-nested embossing patterns can, in some cases, actually detract from the acceptance of the product by making the product appear somewhat rough or stiff.

Accordingly, it would be desirable to provide an embossed product having both discrete and linear embossing elements. It would also be desirable to have a deep-nested embossed web including discrete and linear embossments. Further still, it would be desirable to provide an embossed web that has increased strength and/or softness over the prior art deep-nested embossed webs. Further, it would be desirable to provide a deep-nested embossed web that provides a more aesthetically pleasing pattern than other embossed webs. It would also be desirable to provide a deep-nested embossed web that is damaged less during the embossing process as compared to prior art deep-embossing apparatuses and methods.

SUMMARY OF THE INVENTION

A web product including one or more plies, the web product having a first side and a second side, the web product including a plurality of discrete embossments extending from the first side to the second side; and at least one linear embossment extending from the second side to the first side, wherein the web product has an average embossment height of greater than about 650 μm.

DETAILED DESCRIPTION OF THE INVENTION

It has been discovered that a new embossing apparatus may provide improvements in deep-nested embossing processes and to the webs that are subjected to such deep-nested embossing processes. In particular, it has been found that in an apparatus for performing a deep-nested embossing process, it may be advantageous for at least one of the embossing members to include at least one non-discrete embossing element. As used herein, the term "discrete" with reference to embossing elements means that the embossing element (which may be interchangeably referred to herein as an embossing protrusion or protuberance) is not contiguous with another embossing element, but rather is separated from all other embossing elements by some distance. Although discrete embossing elements can be any size or shape, they are typically generally circular or oval in cross-section at their distal end (i.e. the end farthest away from the surface from which the embossing element extends). If generally circular in cross-section, the discrete embossing elements typically have a diameter at their distal end of less than about 15 mm, less than about 7.5 mm, less than about 5.0 mm, less than about 3.0 mm, less than about 1.0 mm, between about 1.0 mm and about 15 mm, or any number within this range. In embodiments wherein the discrete embossing elements are non-circular, the discrete embossing elements may have a major length dimension (i.e. the longest dimension at the distal end parallel to the surface from which the embossing element extends) and a minor length dimension (i.e. the shortest dimension at the distal end parallel to the surface from which the embossing element extends). The dimensions set forth above with regard to the diameter of the distal end of generally circular discrete embossing elements are applicable to the major length at the distal end of non-circular discrete embossing elements. Further, in such cases, in order to not be considered linear, the discrete embossing elements will have a ratio of the major length to the minor length dimension of less than about 3.5:1, less than about 3:1, less than about 2.5:1, between about 3.5:1 and about 1:1, or any ratio within the range.

As used herein, the term "continuous" refers to an embossing pattern including an embossing element that extends continuously along at least one path without a break or interruption. That is, one can trace along the entirety of the continuous embossing pattern without ever having to cross a break or interruption in the pattern.

Figure 8:
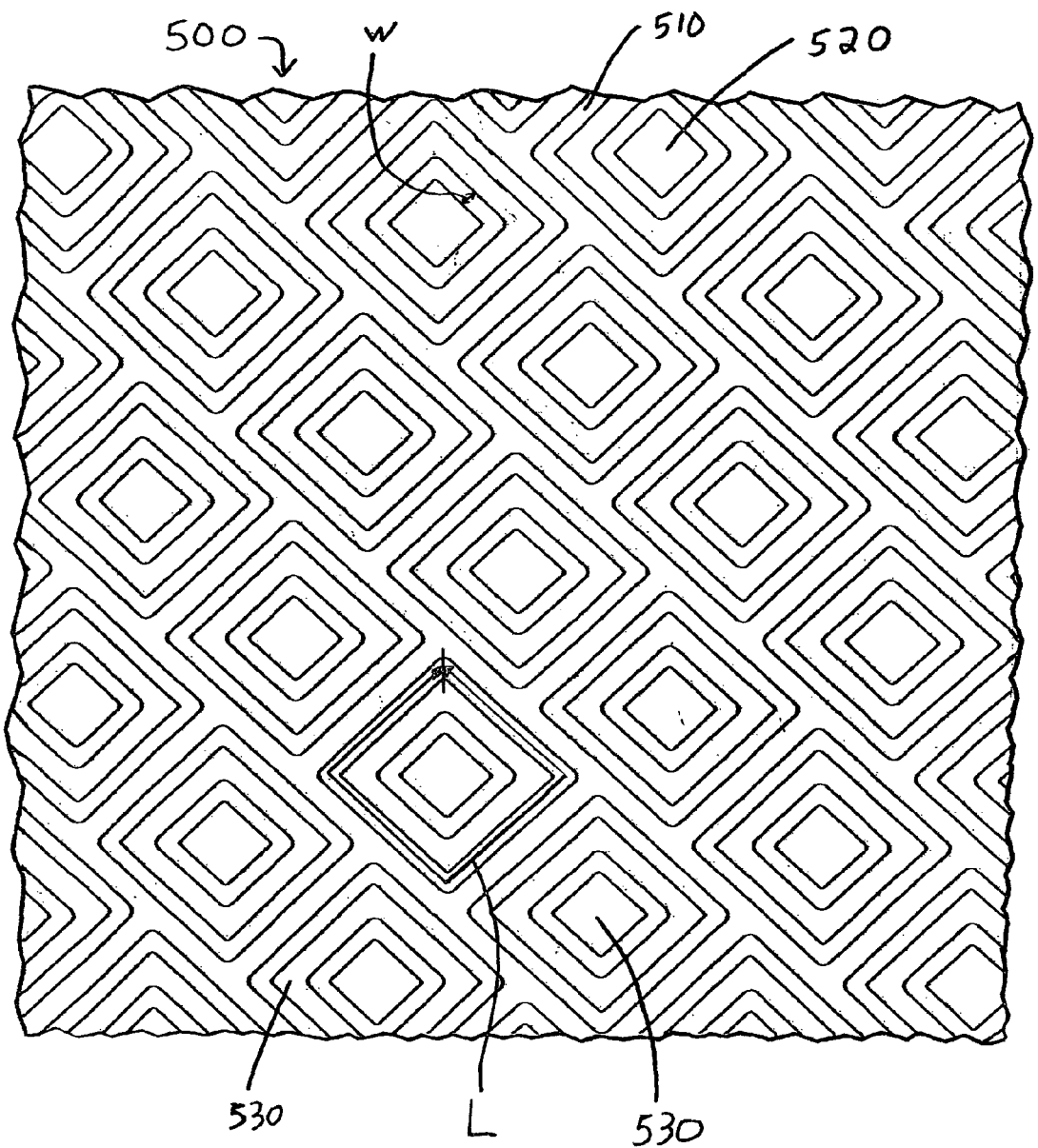
FIG. 8 is a plan view of one example of an embossing pattern including non-discrete, embossing protrusions having linear portions. The pattern shown in FIG. 8 is an example of a pattern that could be complimentary to the pattern of discrete embossing protrusions of FIG. 7.

As used herein, the term "linear" as it refers to embossing elements means that the embossing element has a dimension in one direction parallel to the surface or plane from which it extends that is longer than any other dimension of the element in another direction also parallel to the surface or plane from which it extends. More specifically, the term linear refers to embossing elements that have a length and a width, wherein the ratio of the length to the width is as least about 4:1, at least about 5:1 or at least about 10:1. Further, a linear element could be continuous, as described herein. (For the purposes of this application, the length of a linear embossing element is measured along a path that substantially corresponds to a longitudinal centerline of the embossing element and the width is measured generally perpendicular to the longitudinal centerline. If the linear embossing element is in the form of an outline of a shape, such as, for example a square, the length of the linear embossing element is taken along the longitudinal centerline of the raised portions of the linear embossing element (e.g. the portions making up the outline of the shape) as opposed to the longitudinal centerline of the area of embossing element including the unraised portions. Thus, the length would generally correspond to the length of the centerline of the outline of the shape formed by the linear embossing elements as opposed to a distance bisecting or otherwise cutting across a portion of the shape. An example of the length measurement of such a linear element is shown in FIG. 8.) In certain embodiments, it may be desirable that the width of the linear embossing element be less than about 15.0 mm, less than about 7.5 mm, less than about 5.0 mm, less than about 2.5 mm, less than about 1.0 mm, between about 1.0 mm and about 15.0 mm, or any number within this range.

The term linear does not require that the embossing element be of any particular shape, other than set forth herein, and it is contemplated that such linear embossing elements can include generally straight lines or curved lines or combinations thereof. In addition, a "linear" element need not be uniform in width and/or height. (For the purposes of this application, the width measurement used to determine the length to width ratio is the widest (or largest width measurement) taken along the length of the embossing element.) Further, the linear embossing elements can form patterns and/or shapes that repeat or do not repeat. Thus, the pattern, if any, formed by the linear embossing elements can be regular or non-regular, as desired.

In certain embodiments, it may be desirable for the apparatus to include an embossing member (e.g. a plate or roll) having discrete embossing elements that mate with linear embossing elements from a corresponding plate or roll. In other embodiments, it may be desirable for the apparatus to include two embossing members each having linear embossing elements that mate with each other. In yet other embodiments, it may be desirable for the apparatus to include embossing members, one or more of which have a combination of discrete and linear embossing elements.

As noted above, the use of such an apparatus and/or a process including the apparatus may provide an improved deep-nested embossed product. For example, the use of such an apparatus and method may provide the web product with improved strength, softness, aesthetics and/or other beneficial characteristics, such as, for example, better printing characteristics, etc. (Although much of the disclosure set forth herein refers to embossing apparatus including rolls, it is to be understood that the information set forth is also applicable to any other type of embossing platform or mechanism from which the embossing elements can extend, such as rolls, cylinders, plates and the like, and the invention of the apparatus or method of using the apparatus should not be limited in any way to a particular apparatus unless expressly set forth in the accompanying claims.)

Figure 1:
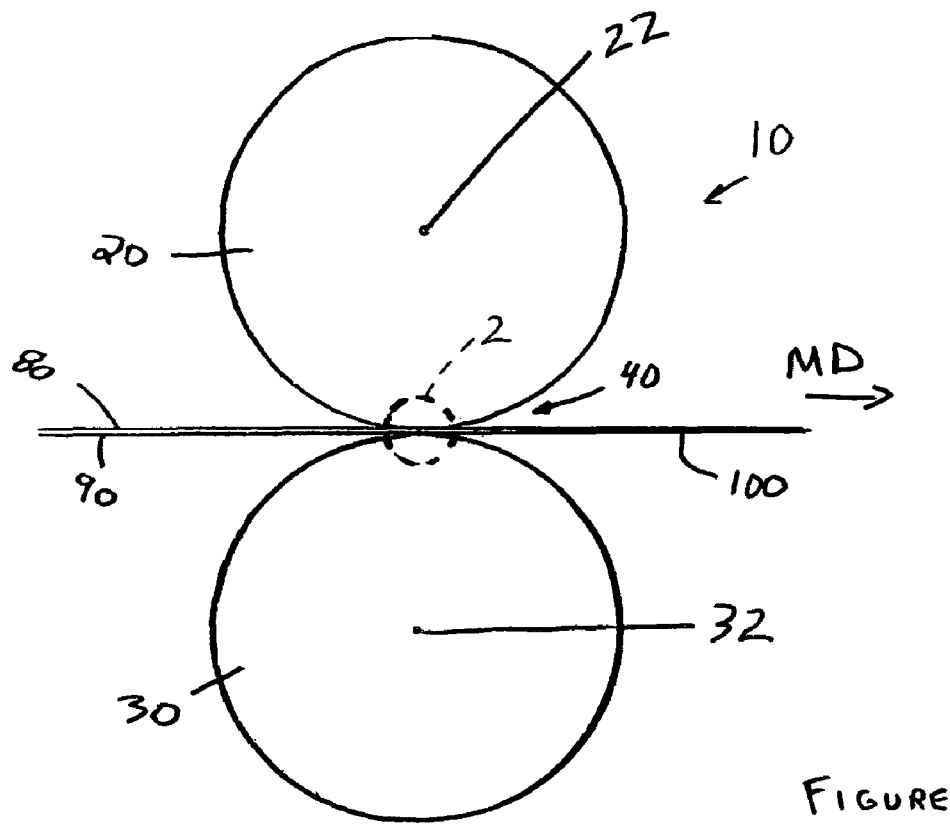
FIG. 1 is a schematic side view of one embodiment of an apparatus that can be used to perform the deep-nested embossing of the present invention.

FIG. 1 shows one embodiment of the apparatus 10 of the present invention. The apparatus 10 includes a pair of rolls, first embossing roll 20 and second embossing roll 30. (It should be noted that the embodiments shown in the figures are just exemplary embodiments and other embodiments are certainly contemplated. For example, the embossing rolls 20 and 30 of the embodiment shown in FIG. 1 could be replaced with any other embossing members such as, for example, plates, cylinders or other equipment suitable for embossing webs. Further, additional equipment and steps that are not specifically described herein may be added to the apparatus and/or process of the present invention.) The embossing rolls 20 and 30 are disposed adjacent each other to provide a nip 40. The rolls 20 and 30 are generally configured so as to be rotatable on an axis, the axes 22 and 32, respectively, of the rolls 20 and 30 are typically generally parallel to one another. The apparatus 10 may be contained within a typical embossing device housing. Each roll has an outer surface 25 and 35 comprising a plurality of protrusions or embossing elements 50 and 60 (shown in more detail in FIG. 2) generally arranged in a non-random pattern. The embossing rolls 20 and 30, including the surfaces of the rolls 25 and 35 as well as the embossing elements 50 and 60, may be made out of any material suitable for the desired embossing process. Such materials include, without limitation, steel and other metals, ebonite, and hard rubber or a combination thereof. As shown in FIG. 1, the first and second embossing rolls 20 and 30 provide a nip 40 through which a web 100 can pass. In the embodiment shown, the web 100 is made up of first ply 80 and second ply 90 and is shown passing through the nip 40 in the machine direction MD.

Figure 2:
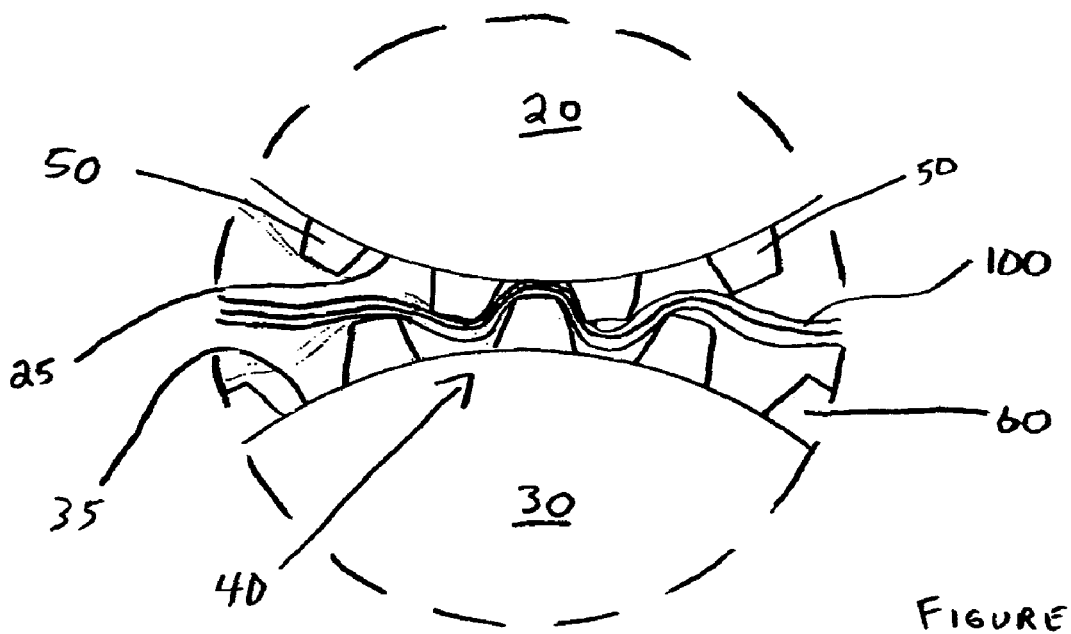
FIG. 2 is an enlarged side view of the nip formed between the embossing rolls of the apparatus shown in FIG. 1.

FIG. 2 is an enlarged view of the portion of the apparatus 10 labeled 2 in FIG. 1. The figure shows a more detailed view of the combined web 100 passing through the nip 40 between the first embossing roll 20 and the second embossing roll 30. As can be seen in FIG. 2, the first embossing roll 20 includes a plurality of first embossing elements 50 extending from the surface 25 of the first embossing roll 20. The second embossing roll also includes a plurality of second embossing elements 60 extending outwardly from the surface 35 of the second embossing roll 30. (It should be noted that when the embossing elements 50 and/or 60 are described as extending from a surface of an embossing member, the embossing elements may be integral with the surface of the embossing member or may be separate elements that are joined to the surface of the embossing member.) As the plies of the web 80 and 90 are passed through the nip 40, they are nested and macroscopically deformed by the intermeshing of the first embossing elements 50 and the second embossing elements 60. The embossing shown is deep-nested embossing, as described herein, because the first embossing elements 50 and the second embossing elements 60 intermesh with each other, for example like the teeth of gears. Thus, the resulting web 100 is deeply embossed and nested, as will be described in more detail below, and includes plurality of undulations that can add bulk and caliper to the web 100.

Figure 3:
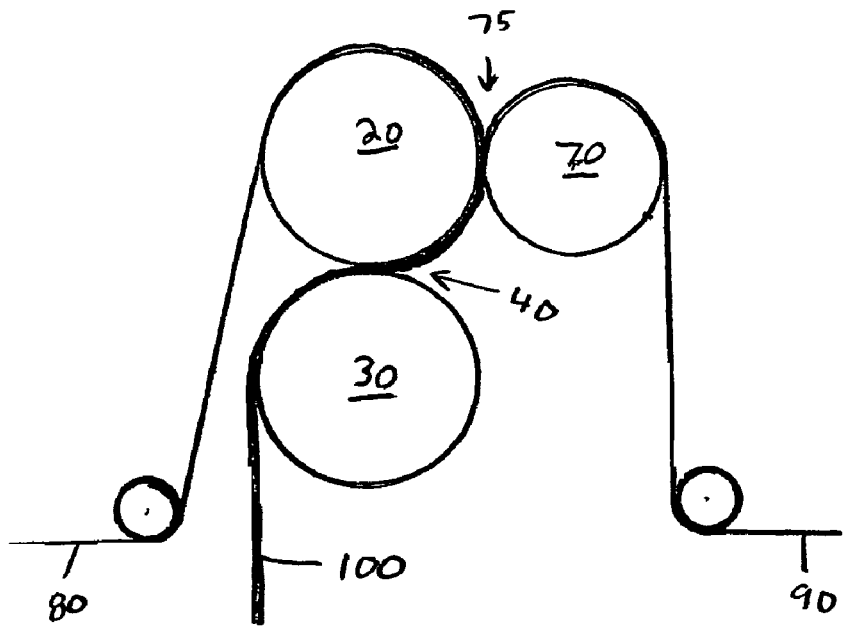
FIG. 3 is a schematic side view of one embodiment of an apparatus that can be used to perform the deep-nested embossing of the present invention.

FIG. 3 shows an alternative embodiment to the process of the present invention wherein the first ply 80 and the second ply 90 of resulting web 100 are joined together between marrying roll 70 and the first embossing roll 20. The plies 80 and 90 can be joined together by any known means, but typically an adhesive application system is used to apply adhesive to one or both of the plies 80 and 90 prior to the plies being passed between the nip 75 formed between the marrying roll 70 and the first embossing roll 20. The combined web 100 is then passed through the nip 40 formed between the first embossing roll 20 and the second embossing roll 30 where it is embossed.

Figure 4:
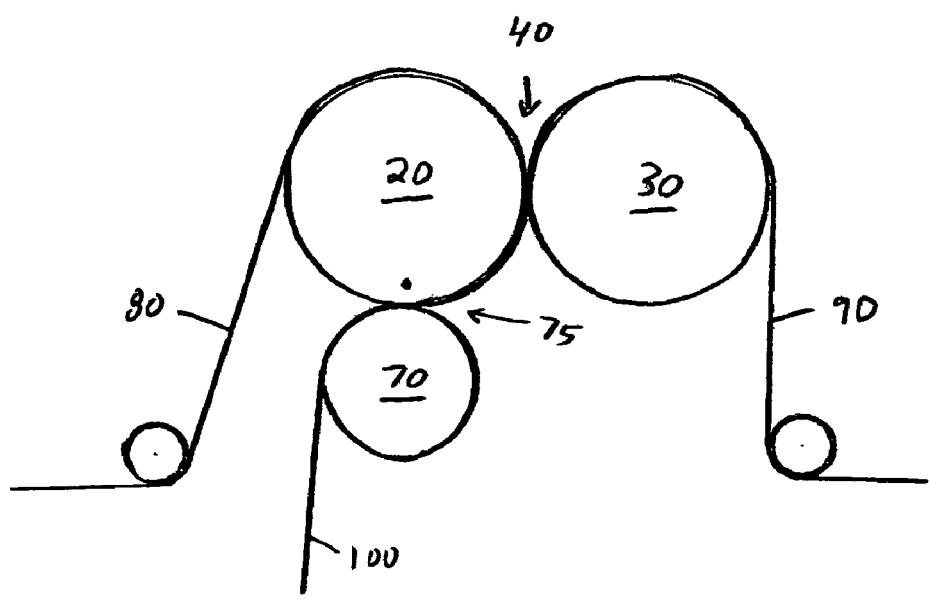
FIG. 4 is a schematic side view of an alternative apparatus that can be used to perform the deep-nested embossing of the present invention.

In yet another possible embodiment of the present invention, as shown in FIG. 4, the plies 80 and 90 are passed through the nip 40 formed between the first embossing roll 20 and the second embossing roll 30 where the plies are placed into contact with each other and embossed. At this stage, it is also common to join the webs together using conventional joining methods such as an adhesive application system, but, as noted above, other joining methods can be used. The combined web 100 is then passed through the nip 75 between the first embossing roll 20 and the marrying roll 70. This step is often used to ensure that the plies 80 and 90 of the web 100 are securely joined together before the web 100 is directed to further processing steps or winding.

It should be noted that with respect to any of the methods described herein, the number of plies is not critical and can be varied, as desired. Thus, it is within the realm of the present invention to utilize methods and equipment that provide a final web product having a single ply, two plies, three plies, four plies or any other number of plies suitable for the desired end use. In each case, it is understood that one of skill in the art would know to add or remove the equipment necessary to provide and/or combine the different number of plies. Further, it should be noted that the plies of a multi-ply web product need not be the same in make-up or other characteristics. Thus, the different plies can be made from different materials, such as from different fibers, different combinations of fibers, natural and synthetic fibers or any other combination of materials making up the base plies. Further, the resulting web 100 may include one or more plies of a cellulosic web and/or one or more plies of a web made from non-cellulose materials including polymeric materials, starch based materials and any other natural or synthetic materials suitable for forming fibrous webs. In addition, one or more of the plies may include a nonwoven web, a woven web, a scrim, a film a foil or any other generally planar sheet-like material. Further, one or more of the plies can be embossed with a pattern that is different that one or more of the other plies or can have no embossments at all.

Figure 5:
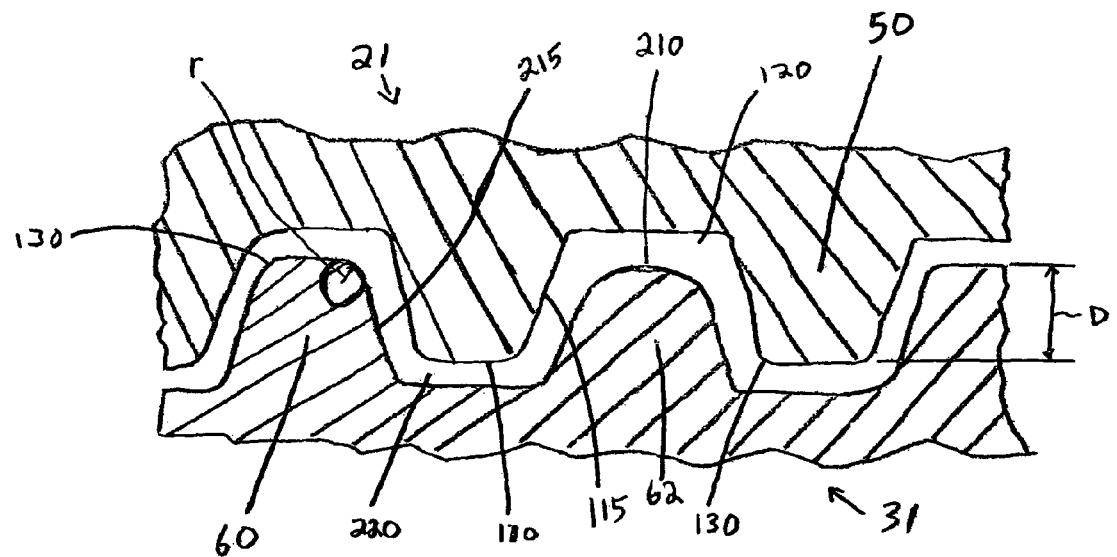
FIG. 5 is a side view of the gap between two engaged emboss cylinders of the apparatus for deep-nested embossing of the present invention.

In the deep-nested emboss process, one example of which is shown in FIG. 5, the embossing elements 50 and 60 of the embossing members (in this case embossing plates 21 and 31) engage such that the distal end 110 of the first embossing elements 50 extend into the space 220 between the second embossing elements 60 of the second embossing roll 30 beyond the distal end 210 of the second embossing elements 60. Accordingly, the distal ends 210 of the second embossing elements 60 should also extend into the space 120 between the first embossing elements 50 of the first embossing roll 20 beyond the distal end 110 of the first embossing elements 50. The depth of the engagement D may vary depending on the level of embossing desired on the final product and can be any distance greater than zero. Typical deep-nested embodiments have a depth D greater than about 0.01 mm, greater than about 0.05 mm, greater than about 1.0 mm, greater than about 1.25 mm, greater than about 1.5 mm, greater than about 2.0 mm, greater than about 3.0 mm, greater than about 4.0 mm, greater than about 5.0 mm, between about 0.01 mm and about 5.0 mm or any number within this range. (It should be noted that although the description in this paragraph describes certain relationships between the embossing elements 50 and 60 disposed on embossing members that are embossing plates 21 and 31, the same engagement characteristics are applicable to embossing elements 50 and 60 that are disposed on embossing members that are not plates, but rather take on a different form, such as, for example, the embossing rolls 20 and 30 shown in FIG. 1.)

In certain embodiments, as shown, for example, in FIG. 5, at least some of the first embossing elements 50 and/or the second embossing elements 60, whether they are linear or discrete, may have at least one transition region 130 that has a radius of curvature of curvature r. The transition region 130 is disposed between the distal end of the embossing element and the sidewall of the embossing element. (As can be seen in FIG. 5, the distal end of the first embossing element is labeled 110, while the sidewall of the first embossing element is labeled 115. Similarly, the distal end of the second embossing element is labeled 210, while one of the sidewalls of the second embossing element is labeled 215.) The radius of curvature of curvature r is typically greater than about 0.075 mm. Other embodiments have radii of greater than 0.1 mm, greater than 0.25 mm, greater than about 0.5 mm, between about 0.075 mm and about 0.5 mm or any number within this range. The radius of curvature of curvature r of any particular transition region is typically less than about 1.8 mm. Other embodiments may have embossing elements with transition regions 130 having radii of less than about 1.5 mm, less than about 1.0 mm, between about 1.0 mm and about 1.8 mm or any number within the range. (Although FIG. 5 shows an example of two intermeshing embossing plates, embossing plate 21 and embossing plate 31, the information set forth herein with respect to the embossing elements 50 and 60 is applicable to any type of embossing platform or mechanism from which the embossing elements can extend, such as rolls, cylinders, plates and the like.)

The "rounding" of the transition region 130 typically results in a circular arc rounded transition region 130 from which a radius of curvature of curvature is determined as a traditional radius of curvature of the arc. The present invention, however, also contemplates transition region configurations which approximate an arc rounding by having the edge of the transition region 130 removed by one or more straight line or irregular cut lines. In such cases, the radius of curvature of curvature r is determined by measuring the radius of curvature of a circular arc that includes a portion which approximates the curve of the transition region 130.

In other embodiments, at least a portion of the distal end of one or more of the embossing elements other than the transition regions 130 can be generally non-planar, including for example, generally curved or rounded. Thus, the entire surface of the embossing element spanning between the sidewalls 115 or 215 can be non-planar, for example curved or rounded. The non-planar surface can take on any shape, including, but not limited to smooth curves or curves, as described above, that are actually a number of straight line or irregular cuts to provide the non-planar surface. One example of such an embossing element is the embossing element 62 shown in FIG. 5. Although not wishing to be bound by theory, it is believed that rounding the transition regions 130 or any portion of the distal ends of the embossing elements can provide the resulting paper with embossments that are more blunt with fewer rough edges. Thus, the resulting paper may be provided with a smoother and/or softer look and feel.

Figure 7:
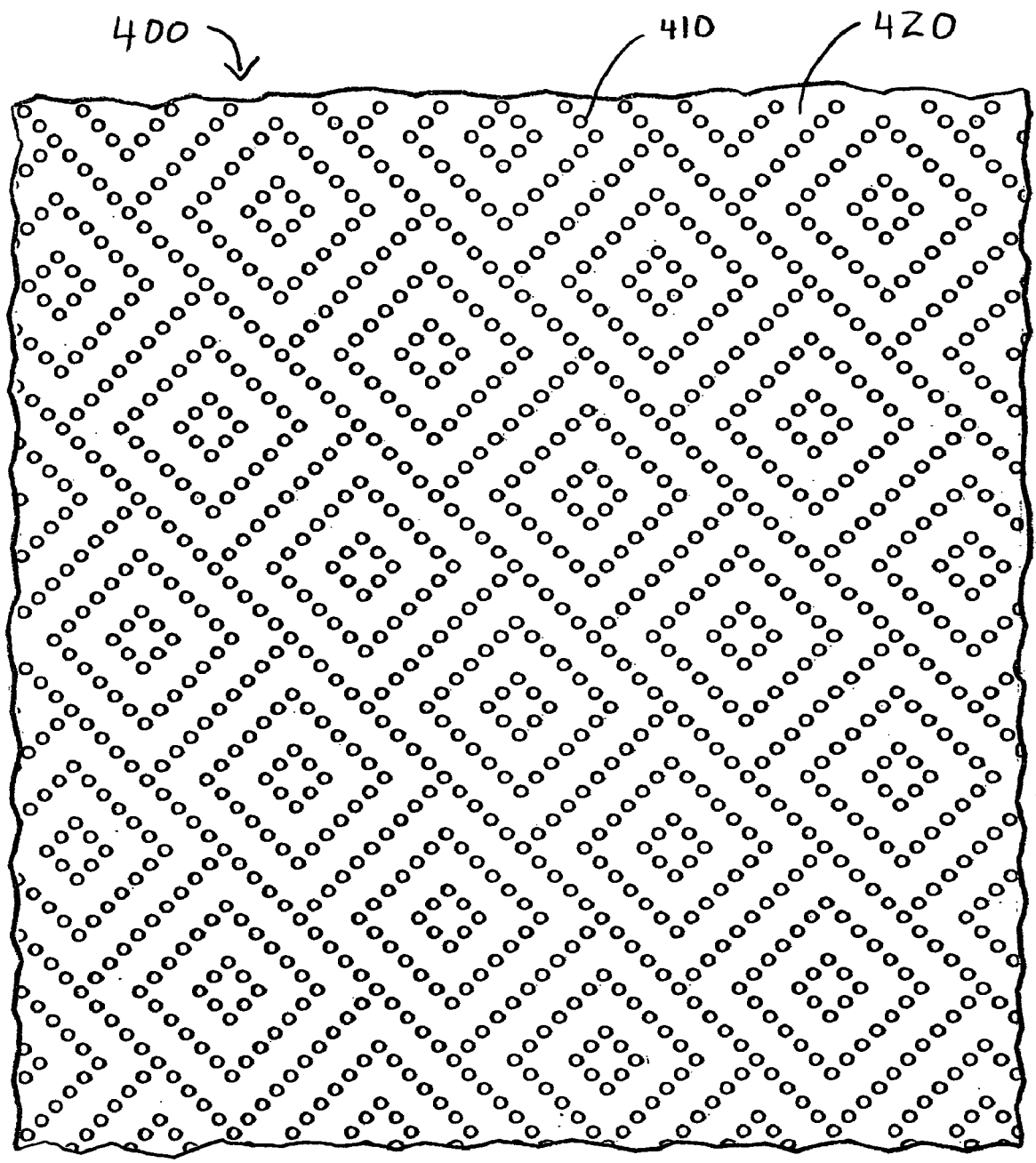
FIG. 7 is a plan view of one example of an embossing pattern including discrete embossing protrusions.

FIG. 7 shows one example of a first embossing pattern 400 that includes discrete embossing elements 410. The discrete embossing elements 410 are separated from each other and form what, in this particular case, appear to be generally circular protrusions that extend from the surface 420 of the plate, roll or other structure on which the pattern 400 is disposed. Although one particular repeating design is shown in FIG. 7, it is just an example of an embossing pattern 400 including at least one discrete embossing element 410. Any other desired pattern could be chosen, including patterns that are not regular and/or do not repeat. Further, the embossing pattern 400 could include both discrete embossing elements and non-discrete embossing elements. Further still, the pattern 400 could include linear embossing elements in addition to the discrete and/or non-discrete embossing elements 400.

FIG. 8 shows one example of a second embossing pattern 500 that includes linear embossing elements 510, as defined herein. The linear embossing elements 510 in the particular pattern shown form the boundaries of a generally square shaped area. As can be seen, the linear embossing elements 510 have a length dimension L (the longest dimension, as defined herein) parallel to the surface 520 from which they extend that is longer than its width dimension W (as defined herein) which is the dimension generally perpendicular to the length dimension L of the embossing element 510 (at the point at which the width dimension is taken) and also parallel to the surface 520 from which it extends. More specifically, the linear embossing elements 510 have a length L to width W ratio that is as least about 4:1, at least about 5:1 or at least about 10:1. Although the length L and width W of the linear embossing elements 510 can be any suitable number, in certain embodiments, it may be desirable that the width W of the linear embossing element be less than about 15 mm, less than about 7.5 mm, less than about 5.0 mm, less than about 2.5 mm, less than about 1.0 mm, between about 1.0 mm and about 15 mm, or any number within this range.

As noted above, the term linear does not require that the embossing element 510 be of any particular shape and it is contemplated that such linear embossing elements 510 can include generally straight lines or curved lines or combinations thereof. Also, as stated above, linear element need not be uniform in width W. A few non-limiting examples of various different possible linear embossing elements with non-uniform widths are shown in FIGS. 10B-C, 11, 12 and 13.

The linear embossing elements 510 can form patterns and/or shapes that repeat or do not repeat. Thus, the pattern, if any, formed by the linear embossing elements 510 can be regular or non-regular, as desired. Further, the particular pattern 500 in which the linear embossing elements 510 are included can also include discrete embossing elements and non-discrete embossing elements. Also, as shown in FIG. 8, the linear second embossing pattern 500 can include a number of different linear embossing elements 510 that are separated from each other to form the desired pattern 500.

As is also shown in FIG. 8, the linear embossing elements 510 may be shaped such that they include an enclosed or at least partially enclosed region, such as region 530. In the particular linear embossing pattern 500 shown, the linear embossing elements 510 are generally in the shape of the outline of a square. Internal to each linear embossing element 510 is the enclosed region 530. Of course, any other linear embossing element 510 shape that completely outlines a region can provide an enclosed region 530. Further, however, as noted above, linear embossing patterns 500 that include linear embossing elements 510 that only partially outline a region may provide at least partially enclosed regions 530 that are also within the scope of the invention. Finally, the linear embossing pattern 500 may include only linear embossing elements that do not in any way encircle or outline regions and thus, do not provide enclosed or at least partially enclosed regions 530, as described herein and shown in FIG. 8.

Figure 9:
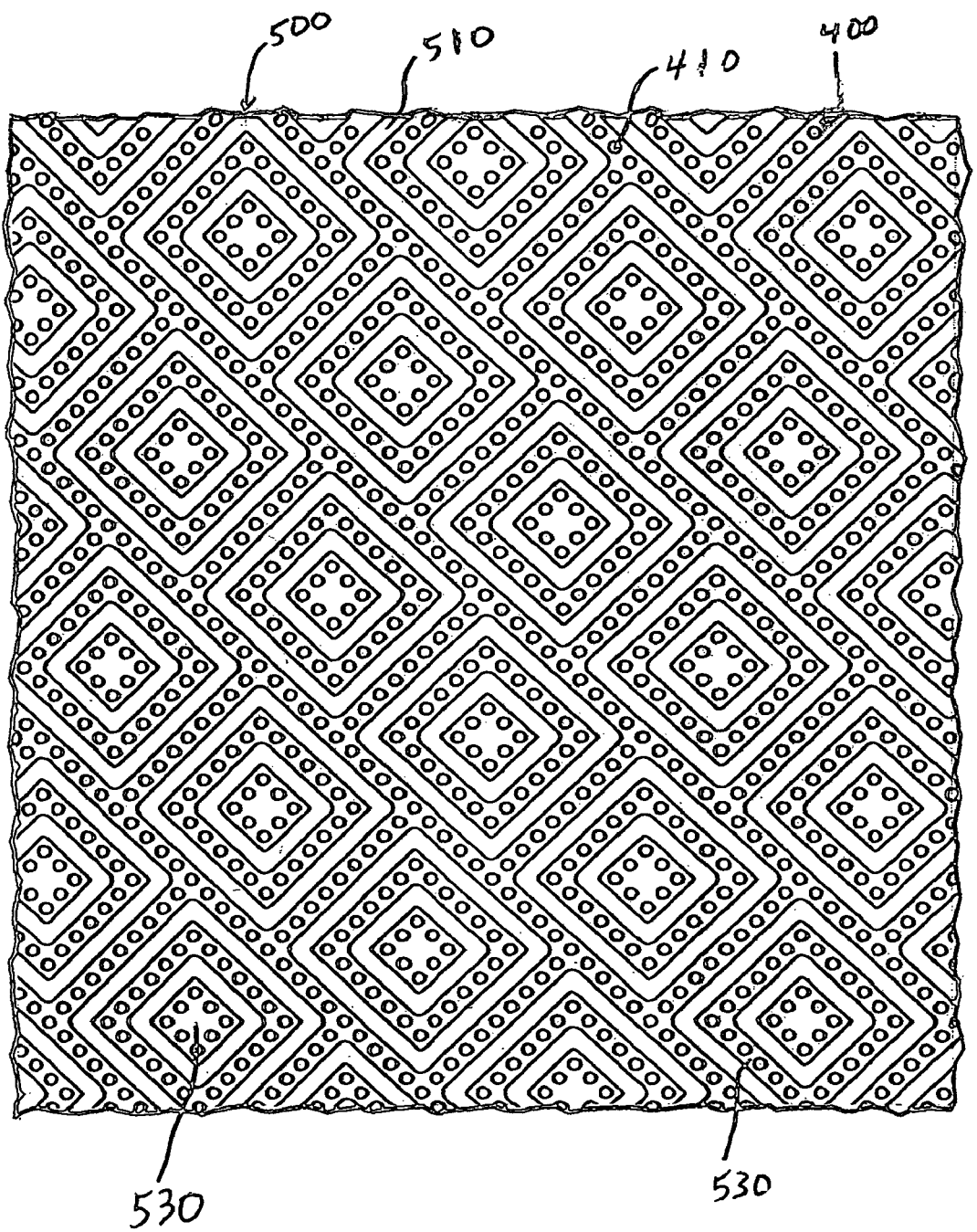
FIG. 9 is a plan view of one example of how the embossing elements of an embossing pattern similar to that shown in FIG. 7 may intermesh with the embossing elements of an embossing pattern similar to that shown in FIG. 8.

FIG. 9 shows an example of an engagement embossing pattern or how it would look if the second embossing pattern 500 of FIG. 8 including linear embossing elements 510 were or engaged with the first pattern 400 of discrete embossing elements 410 of FIG. 7, as shown on in a single plane. As shown, the linear embossing elements 510 of the second embossing pattern 500 are adjacent to and interposed between the discrete embossing elements 410 of the first embossing pattern 400. In this particular configuration, every discrete embossing element 410 is adjacent a linear embossing element 510. Further, in this particular embodiment, all of the linear embossing elements 510 (in this case generally square in shape) are separated from each other by at least one discrete embossing element 410. Also, as shown in FIG. 9, the linear embossing elements 510 provide enclosed regions 530 within the boundaries of the linear embossing elements 510. In the particular embodiment shown, when the linear embossing pattern 500 is engaged with the discrete embossing pattern 400, the enclosed regions 530 include discrete embossing elements 410. Although in FIG. 9 it is shown that every enclosed region 530 includes at least one discrete embossing element 410 when the embossing patterns 400 and 500 are engaged, embodiments are contemplated wherein discrete embossing elements 410 are not disposed in any enclosed or partially enclosed region 530 or are disposed in only one enclosed or partially enclosed region or are disposed in some, but not all of the enclosed or partially enclosed regions 530.

It has been found that the interposition of linear embossing elements, such as those shown in FIG. 8, between discrete embossing elements, such as those shown in FIG. 7, may provide unique benefits to the embossing process and the web that is embossed. For example, as compared to mating deep-nested embossing plates or rolls including only discrete embossing elements, the mating of linear embossing elements with discrete embossing elements can reduce the likelihood that the web will be damaged or severed during embossing. Further, the use of such an apparatus can increase the reliability of the embossing process, and thus, reduce down time and the cost of supplying the end product. Further still, with respect to the embossed web, the use of the apparatus 10 of the present invention can provide the web with improved smoothness and softness properties. Further yet, the apparatus 10 of the present invention can be used to produce a web product that is more aesthetically pleasing than a typical apparatus and method that includes only patterns of discrete embossing elements or even discrete and linear elements that are not interposed as the patterns are shown, for example, in FIG. 9. Also, the present apparatus and method for embossing a web can provide an embossed web that is sided. That is, the web has very different feel and look characteristics on the opposed surfaces of the web. In certain embodiments, sidedness may be desirable.

Figure 10A:
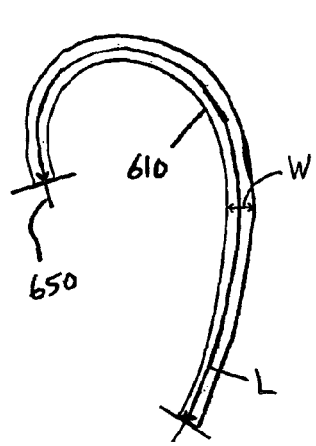
FIGS. 10A-10C are examples of linear embossing elements.
Figure 10B:
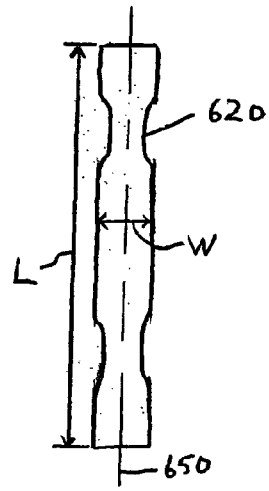
Figure 10C:
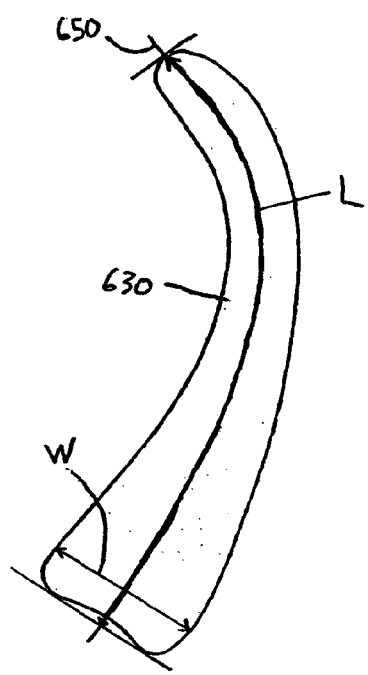

FIGS. 10A-C are just some examples of alternative linear embossing elements 610, 620 and 630 having different shapes. In each case, the linear embossing elements 610, 620 and 630 have a length L and a width W, measured as set forth herein and shown in the figures. In each case, the linear embossing element has a longitudinal centerline 650 that extends along the length of the embossing element. As shown, the length L of each embossing element is derived from measuring the length of the embossment along the longitudinal centerline 650 from one end of the embossing element to the opposing end of the embossing element. The width W is measured generally perpendicular to the longitudinal centerline 650. As noted above, for the purposes of determining the length to width ratio of the linear element, the width W is measured at the point where the embossing element is the widest or the width value will be the greatest.

Figure 11:
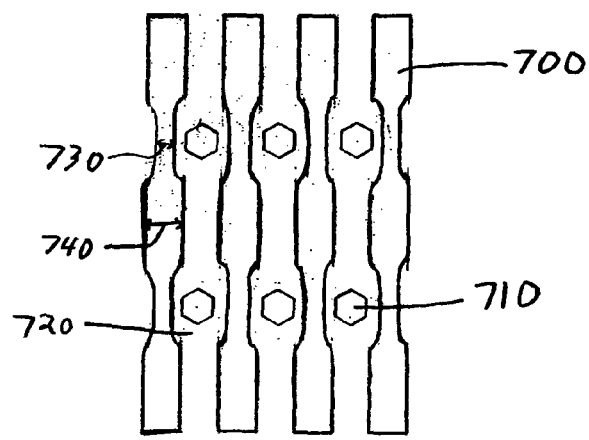
FIG. 11 is a plan view of one example of how the embossing elements of one pattern may intermesh with the embossing elements of another embossing pattern.

FIG. 11 shows a plan view of an exemplary embossing pattern including a plurality of linear embossing elements 700 and a plurality of discrete embossing elements 710. In the particular pattern shown, the linear embossing elements 700 are non-uniform in width and provide spaces 720 into which the discrete embossing elements may be disposed or engaged. In the example shown, the linear embossing elements 700 have a first width 730 and a second width 740. The first width 730 is smaller than the second width 740. Accordingly, in the configuration shown, the smaller first widths 730 of the linear embossing elements 700 provide the spaces 720 in which the discrete embossing elements 710 are disposed or engaged. (As noted above, the web embossed using the apparatus 10 of the present invention may include embossments that are of the same general shape, size and pattern as the embossing elements that emboss the web. Thus, an embossed web having embossments shaped, sized and configured in a pattern similar to that described herein with respect to the embossing elements is contemplated.)

The embossing elements 710 and 700 shown in FIG. 11 could be configured such that the linear embossing elements 700 and the discrete embossing elements 710 are disposed on a single embossing member. Alternatively, at least one of the linear embossing elements 700 could be disposed on a first embossing member and at least one of the discrete embossing elements could be disposed on a second embossing member such that they engage each other when the embossing members are brought together to emboss a web. In yet another embodiment, all of the linear embossing elements 700 may be disposed on a first embossing member and all of the discrete embossing elements 710 may be disposed on a second embossing member.

Figure 12:
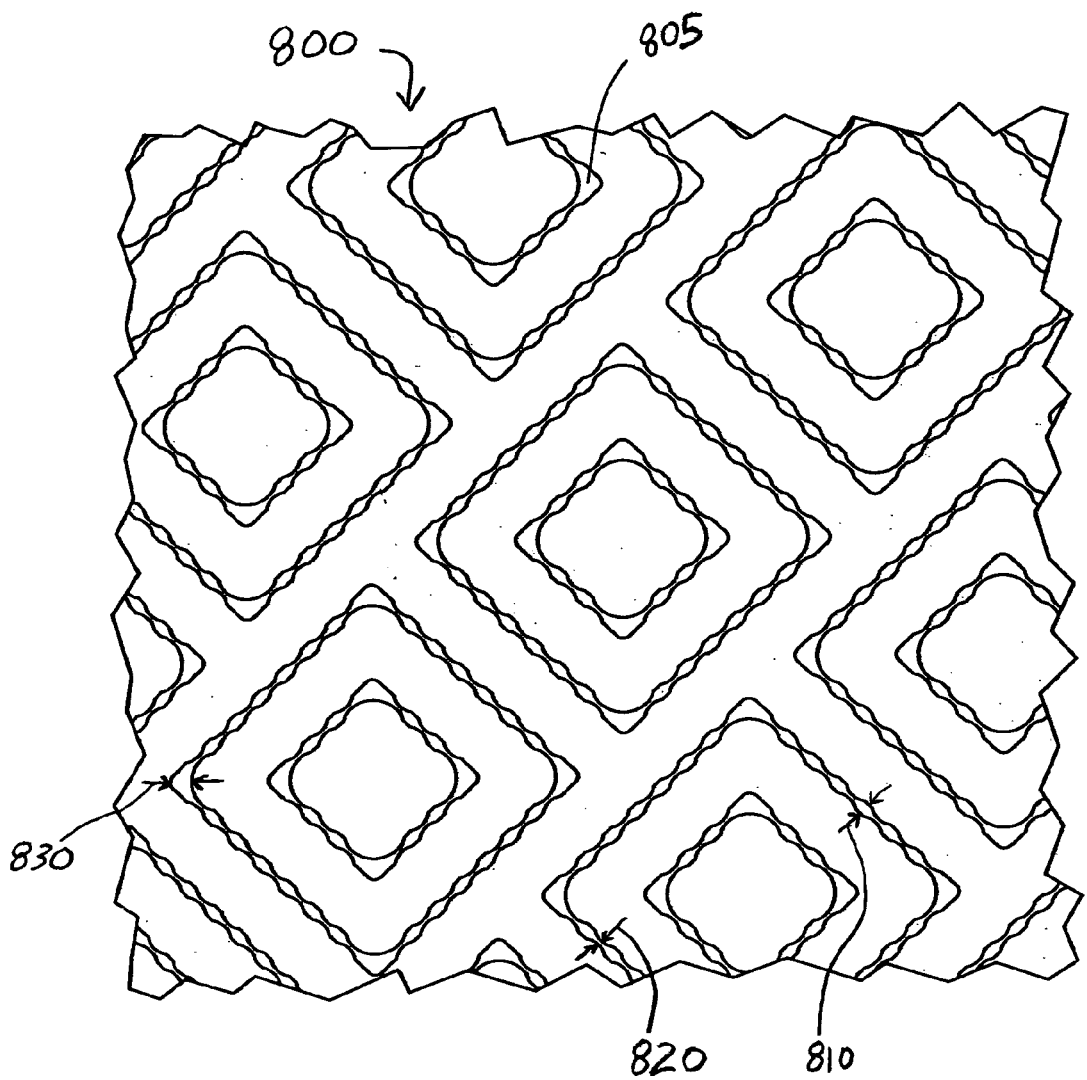
FIG. 12 is a plan view of an alternative example of an embossing pattern including non-discrete embossing protrusions having linear portions. The pattern shown in FIG. 12 is an example of a pattern that could be complimentary to a pattern of discrete embossing protrusions similar to that of FIG. 7.

FIG. 12 is a plan view of a pattern 800 of linear embossing elements 805. The linear embossing elements 805 are generally in the shape of an outline of a square and are non-uniform in width. As shown, the linear embossing elements 805 have a first width 810, a second width 820 and a third width 830. In the particular embodiment shown in FIG. 12, the first width 810 is larger than the second width 820 and the third width 830 is larger than the first width 810 and the second width 820. Also, as shown, the linear embossing elements 805, although non-uniform in width, have a regular pattern of width changing, but such a regular pattern is not necessary for any particular embodiment.

Figure 13:
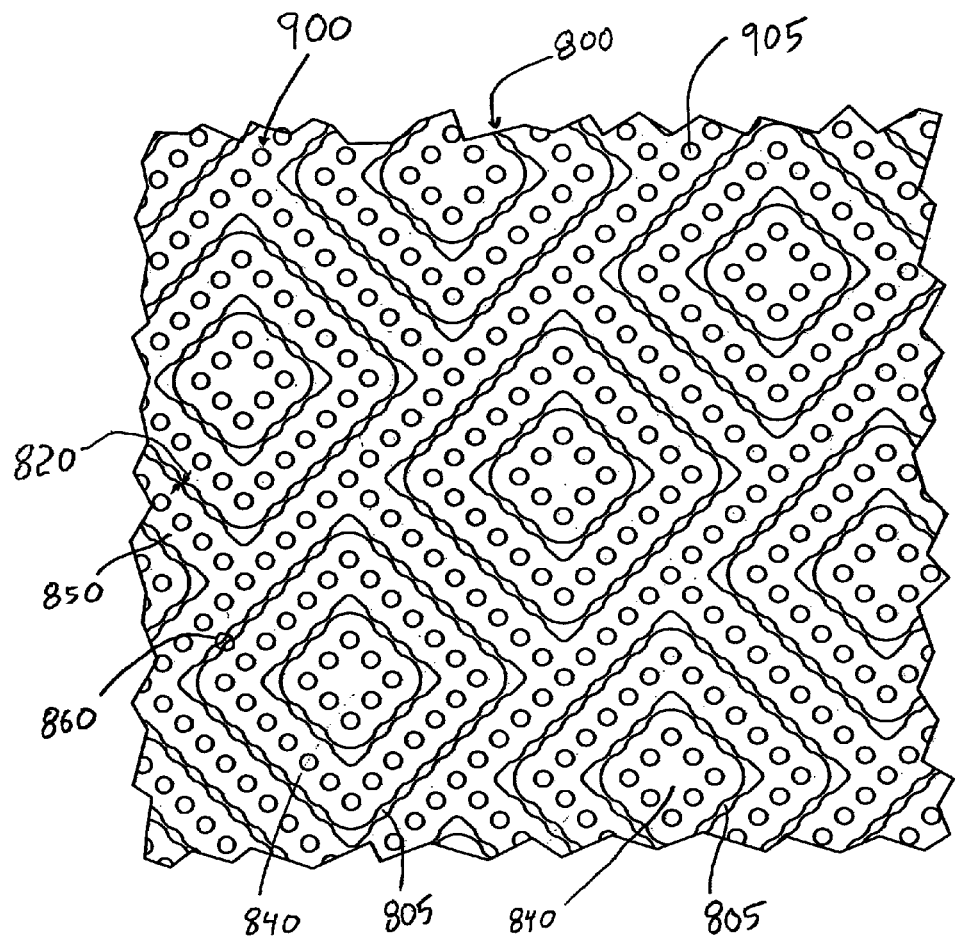
FIG. 13 is a plan view of one example of how the embossing elements of an embossing pattern similar to that shown in FIG. 7 may intermesh with the embossing elements of an embossing pattern similar to that shown in FIG. 12.

FIG. 13 shows an example of the engagement of two embossing patterns, or how it would look if the embossing pattern 800 of FIG. 12 including linear embossing elements 805 were laid upon or engaged with a pattern 900 of discrete embossing elements 905 similar to that of the pattern 400 of FIG. 7. (The pattern 900 of FIG. 13 and pattern 400 of FIG. 7 are not intended to be of the same scale, but are merely representative of generally similar patterns of discrete embossing elements.) As shown, the linear embossing elements 805 of the embossing pattern 800 are adjacent to and interposed between the discrete embossing elements 905 of the embossing pattern 900. In this particular configuration, every discrete embossing element 905 is adjacent a linear embossing element 805. Further, in this particular embodiment, all of the linear embossing elements 805 (in this case generally square in shape) are separated from each other by at least one discrete embossing element 905. Also, as shown in FIG. 13, the linear embossing elements 805 provide enclosed regions 840 within the boundaries of the linear embossing elements 805. In the particular embodiment shown, when the linear embossing pattern 800 is engaged with the discrete embossing pattern 900, the enclosed regions 840 include discrete embossing elements 905. Although in FIG. 13 it is shown that every enclosed region 840 includes at least one discrete embossing element 905 when the embossing patterns 800 and 900 are engaged, embodiments are contemplated wherein discrete embossing elements 905 are not disposed in any enclosed or partially enclosed region 840 or are disposed in only one enclosed or partially enclosed region or are disposed in some, but not all of the enclosed or partially enclosed regions 840.

FIG. 13 also shows an embodiment of the present invention wherein, when engaged, the non-uniform width of the linear embossing elements 805 provides a unique intermeshing pattern with the discrete embossing elements 905, similar to that shown in FIG. 11. In particular, at least some of the discrete embossing elements 905 are located in spaces 850 provided by the regions of the linear elements 805 having reduced widths 860, which generally correspond to the portions of the linear embossing elements 805 having the second width 820. In the embodiment shown, the linear embossing elements 805 are aligned such that linear embossing elements 805 that are nearest each other have corresponding regions of reduced width 860. These corresponding regions of reduced width 860 provide at least some of the spaces 850 in which the discrete embossing elements 905 may be disposed or engaged. It has been found that providing such non-uniform linear embossing elements 805 in a pattern wherein the linear embossing elements 805 are aligned such that linear embossing elements 805 that are nearest each other have corresponding regions of reduced width 860 and provide at least some of the spaces 850 in which discrete embossing elements 905 may be disposed or engaged may be advantageous to the method of the present invention as well as the web that is embossed by the method. Such advantages may include, but are not limited to increased softness, higher line efficiency, reduced web breaks, and fewer holes in the web created by the embossing process.

Figure 14:
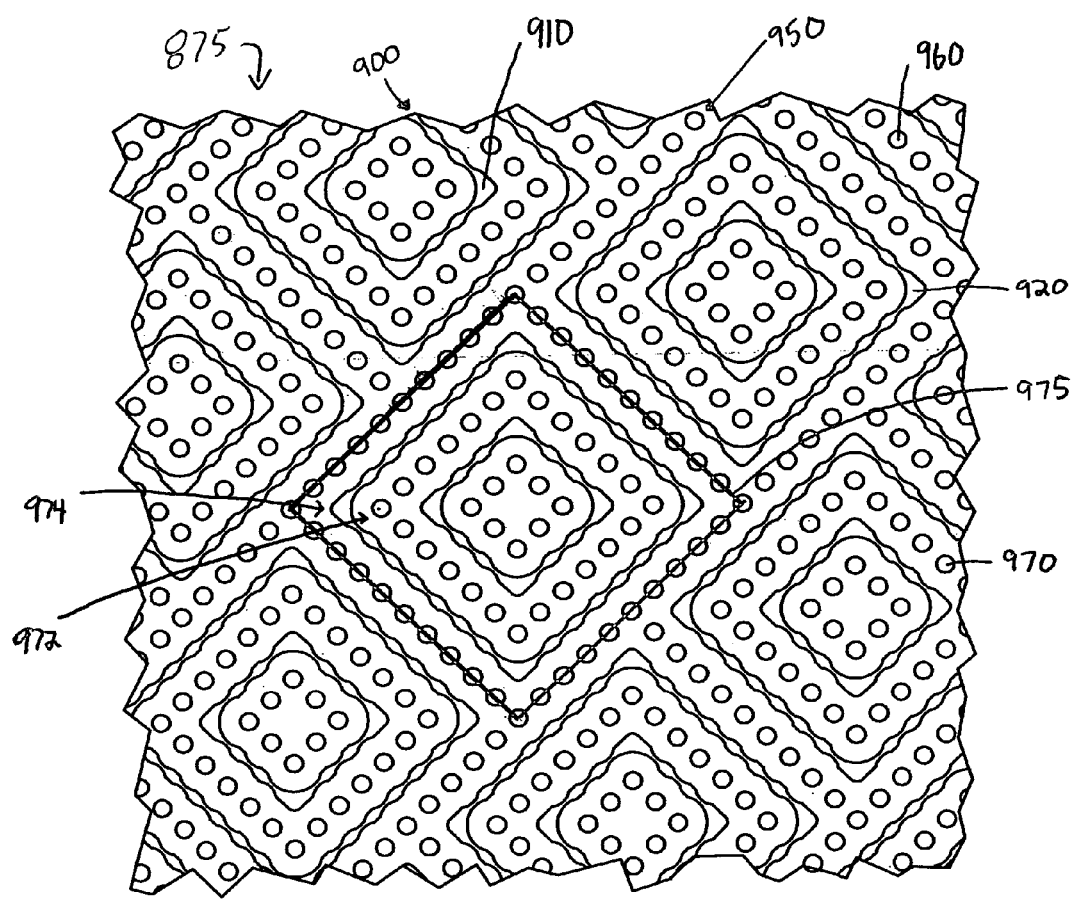
FIG. 14 is a plan view of one example of how the embossing elements of an embossing pattern with linear elements and embossing pattern with discrete embossing elements would appear if intermeshed with each other and shown on a single plane.

Another aspect of the present invention that can provide advantages over other embossing apparatuses and methods relates to the total area of the embossing surface of the embossing elements in relation to the overall area of the surface (or distal end) of the embossing members as well as the relationship between the area of the embossing surface of the linear embossing elements and the discrete embossing elements. FIG. 14 shows a combined embossing pattern 875, which includes the linear embossing pattern 900 including the linear embossing elements 910 and the discrete embossing pattern 950 which includes the discrete embossing elements 960. As with FIGS. 9 and 13, FIG. 14 shows both the linear embossing pattern 900 and the discrete embossing pattern 950 as they would appear if they were engaged with each other, but shown on a single plane. The embossing surface or distal ends 920 and 970 of the linear embossing elements 910 and the discrete embossing elements 960, respectively, are shown. (As used herein, the term "distal end" refers to the surface of the embossing element that is located away from the surface of the embossing member and which generally contacts the web to be embossed. In most cases, the distal end will be generally planar, but could have a slight curve or taper. Thus, for the purposes of this invention, the distal end includes the surface of the embossing element that is raised from the surface of the embossing member and generally parallel to the surface of the embossing member, including deviations from parallel of up to 45 degrees.) The combined embossing pattern 875 includes a repeating pattern of both linear embossing elements 910 and discrete embossing elements 960. A planar projected view of a single unit of the repeating combined embossing pattern 875 is shown and labeled 975. In this particular embodiment, the embossing pattern single pattern unit 975 is repeated, as shown, to form the combined embossing pattern 875. (Of course, different repeating units may be used and the one shown in FIG. 14 is just one non-limiting example of a combined embossing pattern that could be used.)

In certain embodiments of the present invention, it may be desirable to design the discrete embossing elements 960 of the discrete embossing pattern 950 such that they are disposed in a first single pattern unit 972. The first single pattern unit 972 includes the portions of the distal ends 970 of the discrete embossing elements 960 that are located within a particular embossing pattern single pattern unit 975. It may be desirable that the total area of the distal ends 970 of the discrete embossing elements 960 in any particular embossing pattern single pattern unit 975 (or first single pattern unit 972) is a certain area or less. For example, it may be desirable that the total area of the distal ends 970 of the discrete embossing elements 960 in one first single pattern unit 972 is less than about 5.0 cm$^2$, less than about 3.5 cm$^2$, less than about 3.0 cm$^2$ or less than about 2.5 cm$^2$.

Further, although the planar projected area of any particular embossing pattern single pattern unit 975 may be any value, in some embodiments, it may be desirable that the planar projected area be a certain value or within a range of values. (The planar projected area of an embossing pattern single pattern unit 975 can be obtained from an impression of the embossing member or the drawing set used to engrave the embossing member.) In certain embodiments, it may be desirable that the planar projected area of the embossing pattern single pattern unit 975 be about 25 cm$^2$. In other exemplary embodiments, the planar projected area of a embossing pattern single pattern unit 975 can be greater than about 5 cm$^2$, greater than about 10 cm$^2$, greater than about 20 cm$^2$, greater than about 30 cm$^2$, greater than about 50 cm$^2$, greater than about 100 cm$^2$ or any suitable area for the particular desired design.

It may also be desirable to design the discrete embossing elements 960 such that the total area of the area of the distal ends 970 of all of the discrete embossing elements 960 in a first single pattern unit 972 is less than about 25%, less than about 20%, less than about 15%, less than about 13%, less than about 12.5%, less than about 10%, less than about 5% or even less than about 2.5% of the total planar projected area of the embossing pattern single pattern unit 975. (If the first single pattern unit 972 is repeated throughout the entire surface of the embossing member, the total area percentages set forth above with respect to a first single pattern unit would also generally correspond to the total area of the distal ends 970 of the discrete embossing elements 960 throughout the entire discrete embossing pattern 950.)

To calculate a total area value for the distal ends of any particular type of embossing element or elements in a first single pattern unit 972, the embossing pattern single pattern unit 975 is first identified. Then, the individual area of each of the distal ends, as defined herein, of each of the relevant embossing elements in the embossing pattern single pattern unit 975 is measured. The total area value is the sum of the individual areas measured. (Only the portion or portions of an embossing element that is part of the distal end, as defined herein, and is part of the embossing pattern single pattern unit, is included in the total area.) One suitable method for obtaining the area measurements is by using computer aided drafting software, such as AUTOCAD 2004. To get the individual area of the distal end of any particular embossing element, the distal end of the embossing element is drawn to scale. The Area function of the program can then be used to calculate the individual area of the distal end of that particular embossing element. The individual areas of the distal ends of any other embossing elements in the embossing pattern single pattern unit 975 can then be measured the same way and the Sum function of the program can be used to add the individual areas to provide the total area value. AUTOCAD 2004 can also be used to measure the planar projected area of the embossing pattern single pattern unit 975.

In certain embodiments of the present invention, it may also be desirable to design the linear embossing elements 910 of the linear embossing pattern 900 such that they are disposed in a second single pattern unit 974. The second single pattern unit includes the portions of the distal ends 920 of the linear embossing elements 910 that are located within a particular embossing pattern single pattern unit 975. It may be desirable that the total area of the distal ends 920 of the linear embossing element 910 in any particular embossing pattern single pattern unit 975 (or second single pattern unit 974) is a certain area or less. For example, it may be desirable that the total area of the distal ends 920 of the linear embossing elements 910 in one second single pattern unit 974 is less than about 10 cm$^2$, less than about 7.5 cm$^2$, less than about 5.0 cm$^2$, less than about 3.0 cm$^2$ or less than about 2.5 cm$^2$. It may also be desirable to design the linear embossing elements 910 such that the total area of the distal ends 920 of all of the linear embossing elements 910 in a second single pattern unit 974 is less than about 50%, less than about 40%, less than about 30%, less than about 25%, less than about 20%, less than about 15% or less than about 13%, less than about 10%, less than about 5% or even less than about 2.5% of the total planar projected area of the embossing pattern single pattern unit 975. (As noted above with respect to the discrete embossing elements 960, if the second single pattern unit 974 is repeated throughout the entire surface of the embossing member, the total area percentages set forth above with respect to the second single pattern unit 974 would also generally correspond to the total area of the distal ends 920 of the linear embossing elements 910 throughout the entire linear embossing pattern 900.)

It may also be desirable to configure the linear embossing elements 910 of the linear embossing pattern 900 and the discrete embossing elements 960 of the discrete embossing pattern 950 such that the ratio of the sum of the area of the distal ends 920 of the linear embossing elements 910 to the sum of the area of the distal ends 970 of the discrete embossing elements 960 for any particular embossing pattern single pattern unit 975 is less than about 3:1, less than about 2:1 or about 1:1. It is believed that the selection of a particular area for the distal ends of the embossing elements, the total area of the embossing elements, the percentage of the total planar projected area of the embossing pattern single pattern unit covered by the distal ends of the discrete and/or linear embossing elements and the ratio of the sum of the distal ends of the discrete embossing elements to the total area of the linear embossing elements can provide advantages to the embossing process such as, for example, increased softness, higher line efficiency, reduced web breaks, and fewer holes in the web created by the embossing process and better overall appearance of the resulting web.

As noted above, the process of the present invention for producing a deep-nested embossed web products includes the steps of providing a first embossing member such as a roll, plate or the like including at least one first embossing element, such as a discrete embossing element. A second embossing member is also provided which includes at least one second embossing element, such as a linear embossing element. The first embossing member and the second embossing member are disposed adjacent each other such that the first embossing element and the second embossing element are capable of intermeshing with each other. In the situation where at least one of the embossing members is a roll, a nip is formed between the roll and the other embossing member. A web is passed through the nip and is embossed as it passes through the nip (e.g. the process shown in FIG. 2). If the embossing platforms are both plates or the like where a nip is not formed, the web is passed between the embossing members and then the plates, for example, are directed toward each other such that the first and second embossing elements 50 and 60 engage one another. The plates are then disengaged and the embossed portion of the web is removed from between the plates. In any case, the web is subjected to deep-nested embossing. Further, the particular pattern of the first embossing elements 50 and the second embossing elements 60 is chosen to provide the resulting web product 100 with the particular aesthetic and or physical properties desired.

Figure 6:
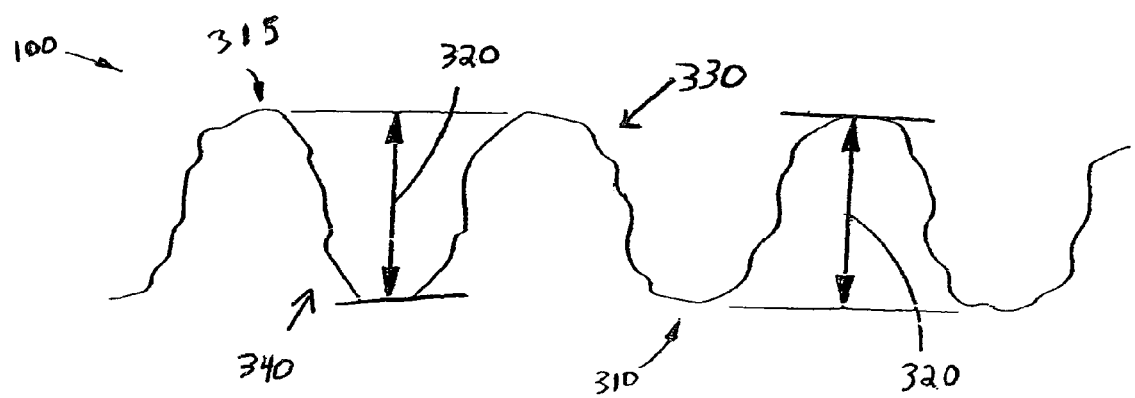
FIG. 6 is a side view of an embodiment of the embossed paper product produced by the apparatus or process of the present invention.

In certain embodiments of the present invention, it may be desirable to orient the first embossing elements 50 and the second embossing elements 60 in a particular way as they relate to the final web product 100. That is, it may be desirable to have the ply or plies of the web 100 pass through the embossing apparatus 10 such that the first embossing elements 50 deform the web 100 toward the outer surface 330 of the web 100. (The outer surface 330 of the web is the surface typically presented outwardly when the product is in a package or stored ready for use, which typically corresponds to the surface of the product that the consumer first sees and touches during normal use. Exemplary representations of the inner surface 340 of the web 100 and outer surface 330 of the web 100 are shown in FIG. 6.) More particularly, in certain embodiments, it may be desirable for the embossing apparatus 10 and method to be configured such that first embossing elements 50 are discrete embossing elements 410, for example those shown in FIG. 7, and are oriented such that they deform the web 100 toward the inner surface 340 of the web 100 and form discrete embossments 310. In these or other embodiments, it may also be desirable for the second embossing elements 60 to include linear embossing elements, such as, for example the linear embossing elements 510 shown in FIG. 8. Thus, the embossing apparatus 10 can be configured such that the linear embossing elements 510 deform the web 100 towards the outer surface 330 of the web 100 to form linear embossments 315. In such configurations, it has been found that the embossed web 100 may appear to be softer, and may in fact feel softer to the user. (Although not wishing to be bound by theory, this is believed to be due to the reduced number of discrete embossments 310 extending toward the outer surface 330 of the web 100.)

In embodiments such as those described above wherein the pattern of discrete embossments formed from the discrete embossing elements 410 are directed inwardly toward the inner surface 340 of the web 100 and the pattern of linear embossments formed from the linear embossing elements 510 are directed outwardly toward the outer surface 330 of the web 100, a web with especially desirable aesthetic and physical characteristics can be produced. In such embodiments, the inwardly facing embossments can be made to appear as a quilting pattern while the linear embossing pattern that extends outwardly can appear and/or feel like pillowed regions between the quilting pattern. This is an improvement over the prior art wherein either all of the embossments were discrete or wherein the embossments, discrete or otherwise were all directed in the same direction (typically inwardly) relative to the surfaces of the resulting web.

The resulting embossed web 100 will typically have embossments with an average embossment height of at least about 650 µm. Other embodiments may have embossment having embossment heights greater than 1000 µm, greater than about 1250 µm, greater than about 1450 µm, at least about 1550 µm, at least about 1800 µm, at least about 2000 µm, at least about 3000 µm, at least about 4000 µm, between about 650 µm and about 4000 µm or any individual number within this range. The average embossment height is measured by the Embossment Height Test Method using a GFM MikroCAD optical profiler instrument, as described in the Test Method section below.

As noted above, the apparatus 10 of the present invention may act on any deformable material. However, the device 10 is most typically used to emboss web-like structures or products that are generally planar and that have length and width dimensions that are significantly greater than the thickness of the web or product. Often, it is advantageous to use such an apparatus 10 on films, nonwoven materials, woven webs, foils, fibrous structures and the like. One suitable type of web for use with the apparatus 10 of the present invention 10 is a paper web. (As used herein, the term "paper web" refers to webs including at least some cellulosic fibers. However, it is contemplated that paper webs suitable for use with the apparatus 10 of the present invention can also include fibers including synthetic materials, natural fibers other than those including cellulose and/or man-made fibers including natural materials.) Certain paper webs are suitable for use as tissue-towel paper products. As used herein, the phrase "tissue-towel paper product" refers to products comprising a paper tissue or paper towel web, including but not limited to conventionally felt-pressed or conventional wet pressed tissue paper webs; pattern densified tissue paper webs; and high-bulk, uncompacted tissue paper webs. Non-limiting examples of tissue-towel paper products include toweling, facial tissue, bath tissue, and table napkins and the like.

In certain embodiments of the present invention, the method includes providing one or more plies of paper having an unembossed wet burst strength. The paper web is embossed resulting in a web having a plurality of embossments with an average embossment height of at least about 650 µm. In certain embodiments, it may be desirable for the resulting web to have a wet burst strength of greater than about 300 g. Further, it may be desirable for the resulting web to have a wet bust strength of greater than about 60%, greater than about 70%, greater than about 75%, greater than about 80%, greater than about 85%, greater than about 90% or greater than about 92% of the unembossed wet burst strength. In such embodiments, the ply or plies of paper produced to be the substrate of the deep-nested embossed paper product may be any type of fibrous structures described herein, such as, for example, the paper is a tissue-towel product. The unembossed wet burst strength of the incoming plies are measured using the Wet Burst Strength Test Method described below. When more than one ply of paper is embossed the wet burst strength is measured on a sample taken on samples of the individual plies placed together, face to face without glue, into the tester.

Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred in certain embodiments since they may impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. Nos. 4,300,981 and 3,994,771 disclose layering of hardwood and softwood fibers. Also applicable to the present invention are fibers derived from recycled paper, which may contain any or all of the above categories as well as other non-fibrous materials such as fillers and adhesives used to facilitate the original papermaking. In addition to the above, fibers and/or filaments made from polymers, specifically hydroxyl polymers may be used in the present invention. Nonlimiting examples of suitable hydroxyl polymers include polyvinyl alcohol, starch, starch derivatives, chitosan, chitosan derivatives, cellulose derivatives, gums, arabinans, galactans and mixtures thereof.

The papermaking fibers utilized for the present invention will normally include fibers derived from wood pulp. Other natural fibrous pulp fibers, such as cotton linters, bagasse, wool fibers, silk fibers, etc., can be utilized and are intended to be within the scope of this invention. Synthetic fibers, such as rayon, polyethylene and polypropylene fibers, may also be utilized in combination with natural cellulosic fibers. One exemplary polyethylene fiber which may be utilized is Pulpex®, available from Hercules, Inc. (Wilmington, Del.).

Representative examples of other than paper substrates can be found in U.S. Pat. No. 4,629,643 issued to Curro et al. on Dec. 16, 1986; U.S. Pat. No. 4,609,518 issued to Curro et al. on Sep. 2, 1986; U.S. Pat. No. 4,603,069 issued to Haq et al. on Jul. 29, 1986; copending U.S. Patent Publications 2004/0154768 A1 published to Trokhan et al. on Aug. 12, 2004; 2004/0154767 A1 published to Trokhan et al. on Aug. 12, 2004; 2003/0021952 A1 published to Zink et al. on Jan. 30, 2003; and 2003/0028165 A1 published to Curro et al. on Feb. 6, 2003.

The paper product substrate may comprise any paper product known in the industry. Embodiment of these substrates may be made according U.S. patents: U.S. Pat. No. 4,191,609 issued Mar. 4, 1980 to Trokhan; U.S. Pat. No. 4,300,981 issued to Carstens on Nov. 17, 1981; U.S. Pat. No. 4,514,345 issued to Johnson et al. on Apr. 30, 1985; U.S. Pat. No. 4,528,239 issued to Trokhan on Jul. 9, 1985; U.S. Pat. No. 4,529,480 issued to Trokhan on Jul. 16, 1985; U.S. Pat. No. 4,637,859 issued to Trokhan on Jan. 20, 1987; U.S. Pat. No. 5,245,025 issued to Trokhan et al. on Sep. 14, 1993; U.S. Pat. No. 5,275,700 issued to Trokhan on Jan. 4, 1994; U.S. Pat. No. 5,328,565 issued to Rasch et al. on Jul. 12, 1994; U.S. Pat. No. 5,334,289 issued to Trokhan et al. on Aug. 2, 1994; U.S. Pat. No. 5,364,504 issued to Smurkowski et al. on Nov. 15, 1995; U.S. Pat. No. 5,527,428 issued to Trokhan et al. on Jun. 18, 1996; U.S. Pat. No. 5,556,509 issued to Trokhan et al. on Sep. 17, 1996; U.S. Pat. No. 5,628,876 issued to Ayers et al.

on May 13, 1997; U.S. Pat. No. 5,629,052 issued to Trokhan et al. on May 13, 1997; U.S. Pat. No. 5,637,194 issued to Ampulski et al. on Jun. 10, 1997; U.S. Pat. No. 5,411,636 issued to Hermans et al. on May 2, 1995; U.S. Pat. No. 6,017,417 issued to Wendt et al. on Jan. 25, 2000; U.S. Pat. No. 5,746,887 issued to Wendt et al. on May 5, 1998; U.S. Pat. No. 5,672,248 issued to Wendt et al. on Sep. 30, 1997; and U.S. Patent Application 2004/0192136A1 published in the name of Gusky et al. on Sep. 30, 2004.

The paper substrates may be manufactured via a wet-laid papermaking process where the resulting web is through-air-dried or conventionally dried. Optionally, the substrate may be foreshortened by creping, by wet microcontraction or by any other means. Creping and/or wet microcontraction are disclosed in commonly assigned U.S. Pat. No. 6,048,938 issued to Neal et al. on Apr. 11, 2000; U.S. Pat. No. 5,942,085 issued to Neal et al. on Aug. 24, 1999; U.S. Pat. No. 5,865,950 issued to Vinson et al. on Feb. 2, 1999; U.S. Pat. No. 4,440,597 issued to Wells et al. on Apr. 3, 1984; U.S. Pat. No. 4,191,756 issued to Sawdai on May 4, 1980; and U.S. Pat. No. 6,187,138 issued to Neal et al. on Feb. 13, 2001.

Conventionally pressed tissue paper and methods for making such paper are, for example, as described in U.S. Pat. No. 6,547,928 issued to Barnholtz et al. on Apr. 15, 2003. One suitable tissue paper is pattern densified tissue paper which is characterized by having a relatively high-bulk field of relatively low fiber density and an array of densified zones of relatively high fiber density. The high-bulk field is alternatively characterized as a field of pillow regions. The densified zones are alternatively referred to as knuckle regions. The densified zones may be discretely spaced within the high-bulk field or may be interconnected, either fully or partially, within the high-bulk field. Processes for making pattern densified tissue webs are disclosed in U.S. Pat. No. 3,301,746 issued to Sanford and Sisson on Jan. 31, 1967; U.S. Pat. No. 3,473,576, issued to Amneus on Oct. 21, 1969; U.S. Pat. No. 3,573,164 issued to Friedberg, et al. on Mar. 30, 1971; U.S. Pat. No. 3,821,068 issued to Salvucci, Jr. et al. on May 21, 1974; U.S. Pat. No. 3,974,025 issued to Ayers on Aug. 10, 1976; U.S. Pat. No. 4,191,609 issued to on Mar. 4, 1980; U.S. Pat. No. 4,239,065 issued to Trokhan on Dec. 16, 1980 and U.S. Pat. No. 4,528,239 issued to Trokhan on Jul. 9, 1985 and U.S. Pat. No. 4,637,859 issued to Trokhan on Jan. 20, 1987.

Uncompacted, non pattern-densified tissue paper structures are also contemplated within the scope of the present invention and are described in U.S. Pat. No. 3,812,000 issued to Joseph L. Salvucci, Jr. and Peter N. Yiannos on May 21, 1974, and U.S. Pat. No. 4,208,459 issued to Henry E. Becker, Albert L. McConnell, and Richard Schutte on Jun. 17, 1980. Uncreped paper can also be subjected to the apparatus and method of the present invention. Suitable techniques for producing uncreped tissue are taught, for example, in U.S. Pat. No. 6,017,417 issued to Wendt et al. on Jan. 25, 2000; U.S. Pat. No. 5,746,887 issued to Wendt et al. on May 5, 1998; U.S. Pat. No. 5,672,248 issued to Wendt et al. on Sep. 30, 1997; U.S. Pat. No. 5,888,347 issued to Engel et al. on Mar. 30, 1999; U.S. Pat. No. 5,667,636 issued to Engel et al. on Sep. 16, 1997; U.S. Pat. No. 5,607,551 issued to Farrington et al. on Mar. 4, 1997 and U.S. Pat. No. 5,656,132 issued to Farrington et al. on Aug. 12, 1997.

The tissue-towel substrates of the present invention may alternatively be manufactured via an air-laid making process. Typical airlaying processes include one or more forming chambers that are placed over a moving foraminous surface, such as a forming screen. For example, fibrous materials and particulate materials are introduced into the forming chamber and a vacuum source is employed to draw an airstream through the forming surface. The air stream deposits the fibers and particulate material onto the moving forming surface. Once the fibers are deposited onto the forming surface, an airlaid web substrate is formed. Once the web exits the forming chambers, the web is passed through one or more compaction devices which increases the density and strength of the web. The density of the web may be increased to between about 0.05 g/cc to about 0.5 g/cc. After compaction, the one or both sides of the web may optionally be sprayed with a bonding material, such as latex compositions or other known water-soluble bonding agents, to add wet and dry strength. If a bonding agent is applied, the web is typically passed through a drying apparatus. An example of one process for making such airlaid paper substrates is found in U.S. Patent Application 2004/0192136A1 filed in the name of Gusky et al. and published on Sep. 30, 2004.

The apparatus and method of the present invention is not limited to any particular type of papermaking and/or converting equipment and can be operated at any suitable line speed. Certain exemplary papermaking and converting equipment are identified herein. Further, although not limited to any particular line speed, typical converting line speeds generally range between about 300 and about 700 meters per minute.

Other optional equipment may be used and/or processes may be performed on the web during its manufacture or after it is manufactured, as desired. These processes can be performed before or after the embossing method of the present invention, as applicable. For example, in certain embodiments, it may be desirable to print on the web. It may also be desirable to register the printing to the emboss pattern. Exemplary methods for registering printing to the embossing pattern are described in more detail in U.S. Patent Application Publication No. 2004/0258887 A1 published Dec. 23, 2004 and 2004/0261639 A1 published Dec. 30, 2004. It may also be desirable to provide heat, moisture or steam to the web prior to the web being embossed. Exemplary suitable apparatuses and methods for providing steam to a web to be embossed are described in U.S. Pat. No. 4,207,143 issued to Glomb et al. on Jun. 10, 1980; U.S. Pat. No. 4,994,144 issued to Smith et al. on Feb. 19, 1991; U.S. Pat. No. 6,074,525 issued to Richards on Jun. 13, 2000 and U.S. Pat. No. 6,077,590 issued to Archer on Jun. 20, 2000. However any suitable apparatus and/or method for providing heat, moisture or steam to the web may be used, including the use of steam bars, airfoils, sprayers, steam chambers or any combination thereof.

Further, for paper webs, optional materials can be added to the aqueous papermaking furnish or the embryonic web to impart other desirable characteristics to the product or improve the papermaking process. Some examples of such materials may include softening agents, wet-strength agents, surfactants, fillers and other known additives or combinations thereof. Similarly, for non-paper webs, optional ingredients, coatings or processes can be used to provide the web with any particular desired characteristics and/or alter the base web's physical or chemical characteristics.

One example of an embossed web product is shown in FIG. 6. The embossed web product 100 comprises one or more plies, wherein at least one of the plies comprises a plurality of discrete embossments 310 and a plurality of linear embossments 315. (Generally, the embossments take on a shape that is similar to the embossing elements used to form the embossments, thus, for the purposes of this application, the shapes and sizes of the embossing elements described herein can also be used to describe suitable embossments. However, it should be noted that the shape of the embossments may not correspond exactly to the shape of any particular embossing element or pattern of embossing elements and thus, embossments of shapes and sizes different than those described herein with regard to the embossing elements are contemplated.) The ply or plies which are embossed are embossed in a deep-nested embossing process such that the embossments exhibit an embossment height 320 of at least about 650 µm, at least about 1000 µm, at least about 1250 µm, at least about 1450 µm, at least about 1550 µm, at least about 1800 µm, between about 650 µm and about 1800 µm, at least about 2000 µm, at least about 3000 µm, at least about 4000 µm, between about 650 µm and about 4000 µm or any individual number within this range. The embossment height 320 of the embossed product 100 is measured by the Embossment Height Test method set forth below.

The web product of the present invention will have an unembossed wet burst strength and an embossed or resulting web wet burst strength. Typically, for paper products, the resulting web product 100 made by the process of the present invention will have a wet burst strength of greater than about 300 g, although there is no minimum limit on the wet burst strength. It is often desirable for the resulting web product 100 to have a wet bust strength of greater than about 60%, greater than about 65%, greater than about 70%, greater than about 75%, greater than about 80%, greater than about 85%, greater than about 90%, or greater than about 92% of the unembossed wet burst strength. Although not required in all embodiments, two of the factors that may contribute to increased wet burst strength efficiency (wet burst strength of the embossed web as a percentage of the wet burst strength of the unembossed web) include the addition of steam to the web prior to embossing and the radius of curvature on the transition regions of the embossing elements, both of which are described herein. Thus, by employing essentially the same apparatus and method for embossing the web, the addition of steam and/or the use of embossing elements with curved transition regions may provide an end product with a wet burst strength and/or a wet burst strength efficiency having a higher lower limit than if the web were not subjected to one or both of steam and/or embossing elements with curved transition regions.

The web product of the present invention may be converted for sale or use into any desired form. For example, the web may be wound into rolls, folded, stacked, perforated and/or cut into individual sheets of any desired size.

EXAMPLES

Example 1

One fibrous structure useful in achieving the embossed paper product is the through-air-dried (TAD), differential density structure described in U.S. Pat. No. 4,528,239. Such a structure may be formed by the following process.

A Fourdrinier, through-air-dried papermaking machine is used in the practice of this invention. A slurry of papermaking fibers is pumped to the headbox at a consistency of about 0.15%. The slurry consists of about 55% Northern Softwood Kraft fibers, about 30% unrefined Eucalyptus fibers and about 15% repulped product broke. The fiber slurry contains a cationic polyamine-epichlorohydrin wet burst strength resin at a concentration of about 10.0 kg per metric ton of dry fiber, and carboxymethyl cellulose at a concentration of about 3.5 kg per metric ton of dry fiber.

Dewatering occurs through the Fourdrinier wire and is assisted by vacuum boxes. The wire is of a configuration having 41.7 machine direction and 42.5 cross direction filaments per cm, such as that available from Asten Johnson known as a "786 wire".

The embryonic wet web is transferred from the Fourdrinier wire at a fiber consistency of about 22% at the point of transfer, to a TAD carrier fabric. The wire speed is about 660 meters per minute. The carrier fabric speed is about 635 meters per minute. Since the wire speed is about 4% faster than the carrier fabric, wet shortening of the web occurs at the transfer point. Thus, the wet web foreshortening is about 4%. The sheet side of the carrier fabric consists of a continuous, patterned network of photopolymer resin, the pattern containing about 90 deflection conduits per inch. The deflection conduits are arranged in an amorphous configuration, and the polymer network covers about 25% of the surface area of the carrier fabric. The polymer resin is supported by and attached to a woven support member having of 27.6 machine direction and 11.8 cross direction filaments per cm. The photopolymer network rises about 0.43 mm above the support member.

The consistency of the web is about 65% after the action of the TAD dryers operating about a 254° C., before transfer onto the Yankee dryer. An aqueous solution of creping adhesive consisting of animal glue and polyvinyl alcohol is applied to the Yankee surface by spray applicators at a rate of about 0.66 kg per metric ton of production. The Yankee dryer is operated at a speed of about 635 meters per minute. The fiber consistency is increased to an estimated 95.5% before creping the web with a doctor blade. The doctor blade has a bevel angle of about 33 degrees and is positioned with respect to the Yankee dryer to provide an impact angle of about 87 degrees. The Yankee dryer is operated at about 157° C., and Yankee hoods are operated at about 120° C.

The dry, creped web is passed between two calendar rolls and rolled on a reel operated at 606 meters per minute so that there is about 9% foreshortening of the web by crepe; about 4% wet microcontraction and an additional 5% dry crepe. The resulting paper has a basis weight of about 23 grams per square meter (gsm).

The paper described above is then subjected to the deep-nested embossing process of this invention. Two emboss cylinders are engraved with complimentary, nesting embossing elements shown in FIGS. 7-9. The cylinders are mounted in the apparatus with their respective axes being generally parallel to one another. The discrete embossing elements are frustaconical in shape, with a face (top or distal—i.e. away from the roll from which they protrude) diameter of about 2.79 mm and a floor (bottom or proximal—i.e. closest to the surface of the roll from which they protrude) diameter of about 4.12 mm. The linear elements have a width similar to that of the discrete embossing elements of about 2.79 mm. The height of the embossing elements on each roll is about 3.81 mm. The radius of curvature of the transition region of the embossing elements is about 0.76 mm. The planar projected area of each embossing pattern single pattern unit is about 25 cm². The engagement of the nested rolls is set to about 3.56 mm, and the paper described above is fed through the engaged gap at a speed between 300 and 400 meters per minute. The resulting paper has an embossment height of greater than about 1450 µm, a finished product wet burst strength greater than about 70% of its unembossed wet burst strength.

Example 2

In another embodiment of the embossed paper products, two separate paper plies are made from the paper making process of Example 1. The two plies are then combined and embossed together by the deep-nested embossing process of Example 1. The resulting paper has an embossment height of greater than about 1450 μm, a finished product wet burst strength greater than about 70% of its unembossed wet burst strength.

Example 3

In another embodiment, three separate paper plies are made from the paper making process of Example 1. Two of the plies are deep-nested embossed by the deep-nested embossing process of the Example 1. The three plies of tissue paper are then combined in a standard converting process such that the two embossed plies are the respective outer plies and the unembossed ply in the inner ply of the product. The resulting paper has an embossment height of greater than about 1450 μm, a finished product wet burst strength greater than about 70% of its unembossed wet burst strength.

Example 4

In another embodiment, the paper described in Example 1 is subjected to a deep-nested embossing process as described in Example 1. The discrete embossing elements are frusta-conical in shape, with a face (top or distal—i.e. away from the roll from which they protrude) diameter of about 2.26 mm and a floor (bottom or proximal—i.e. closest to the surface of the roll from which they protrude) diameter of about 4.12 mm. The linear elements have a width similar to that of the discrete embossing elements of about 2.26 mm. The height of the embossing elements on each roll is about 3.81 mm. The radius of curvature of the transition region of each embossing element is about 0.76 mm. The planar projected area of each embossing pattern single pattern unit is about 17 cm$^2$. The engagement of the nested rolls is set to about 3.1 mm, and the paper described above is fed through the engaged gap at a speed between 300 and 400 meters per minute. The resulting paper has an embossment height of greater than about 1450 μm, a finished product wet burst strength greater than about 70% of its unembossed wet burst strength.

Example 5

In another embodiment, the paper described in Example 1 is subjected to a deep-nested embossing process as described in Example 1. The discrete embossing elements are frusta-conical in shape, with a face (top or distal—i.e. away from the roll from which they protrude) diameter of about 2.79 mm and a floor (bottom or proximal—i.e. closest to the surface of the roll from which they protrude) diameter of about 4.12 mm. The linear elements have a width similar to that of the discrete embossing elements of about 2.79 mm. The height of the embossing elements on each roll is about 3.81 mm. The radius of curvature of the transition region of each embossing element is about 0.76 mm. The planar projected area of each embossing pattern single pattern unit is about 25 cm$^2$. The engagement of the nested rolls is set to about 3.1 mm, and the paper described above is fed through the engaged nip at a speed between 300 and 400 meters per minute. However, prior to feeding the paper through the nip, steam is directed onto one surface of the paper. The temperature of the paper at the point of emboss is about 36° C. The resulting paper has an embossment height of greater than about 1450 μm, a finished product wet burst strength greater than about 85% of its unembossed wet burst strength.

Example 6

One example of a through-air dried, differential density structure, as described in U.S. Pat. No. 4,528,239 may be formed by the following process.

The TAD carrier fabric of Example 1 is replaced with a carrier fabric consisting of 88.6 bi-axially staggered deflection conduits per cm, and a resin height of about 0.305 mm. The paper is subjected to the embossing process of Example 1, and the resulting paper has an embossment height of greater than about 1450 μm and a finished product wet burst strength greater than about 70% of its unembossed wet burst strength.

Example 7

An alternative embodiment is a paper structure having a wet microcontraction greater than about 5% in combination with any known through air dried process. Wet microcontraction is described in U.S. Pat. No. 4,440,597. An example of this embodiment may be produced by the following process.

The wire speed is increased to about 706 meters per minute. The carrier fabric speed is about 635 meters per minute. The wire speed is 10% faster compared to the TAD carrier fabric so that the wet web foreshortening is 10%. The TAD carrier fabric of Example 1 is replaced by a carrier fabric having a 5-shed weave, 14.2 machine direction filaments and 12.6 cross-direction filaments per cm. The Yankee speed is about 635 meters per minute and the reel speed is about 572 meters per minute. The web is foreshortened 10% by wet microcontraction and an additional 10% by dry crepe. The resulting paper prior to embossing has a basis weight of about 33 gsm. This paper is further subjected to the embossing process of Example 1, and the resulting paper has an embossment height of greater than about 1450 μm and a finished product wet burst strength greater than about 70% of its unembossed wet burst strength.

Test Methods

Embossment Height Test Method

Embossment height is measured using an Optical 3D Measuring System MikroCAD compact for paper measurement instrument (the "GFM MikroCAD optical profiler instrument") and ODSCAD Version 4.0 software available from GFMesstechnik GmbH, Warthestraβe E21, D14513 Teltow, Berlin, Germany. The GFM MikroCAD optical profiler instrument includes a compact optical measuring sensor based on digital micro-mirror projection, consisting of the following components:

A) A DMD projector with 1024×768 direct digital controlled micro-mirrors.
B) CCD camera with high resolution (1300×1000 pixels).
C) Projection optics adapted to a measuring area of at least 27×22 mm.
D) Recording optics adapted to a measuring area of at least 27×22 mm; a table tripod based on a small hard stone plate; a cold-light source; a measuring, control, and evaluation computer; measuring, control, and evaluation software, and adjusting probes for lateral (X-Y) and vertical (Z) calibration.
E) Schott KL1500 LCD cold light source.
F) Table and tripod based on a small hard stone plate.

G) Measuring, control and evaluation computer.

H) Measuring, control and evaluation software ODSCAD 4.0.

I) Adjusting probes for lateral (x-y) and vertical (z) calibration.

The GFM MikroCAD optical profiler system measures the height of a sample using the digital micro-mirror pattern projection technique. The result of the analysis is a map of surface height (Z) versus X-Y displacement. The system should provide a field of view of 27×22 mm with a resolution of 21 µm. The height resolution is set to between 0.10 µm and 1.00 µm. The height range is 64,000 times the resolution. To measure a fibrous structure sample, the following steps are utilized:

1. Turn on the cold-light source. The settings on the cold-light source are set to provide a reading of at least 2,800 k on the display.
2. Turn on the computer, monitor, and printer, and open the software.
3. Select "Start Measurement" icon from the ODSCAD task bar and then click the "Live Image" button.
4. Obtain a fibrous structure sample that is larger than the equipment field of view and conditioned at a temperature of 73° F.±2° F. (about 23° C.±1° C.) and a relative humidity of 50%±2% for 2 hours. Place the sample under the projection head. Position the projection head to be normal to the sample surface.
5. Adjust the distance between the sample and the projection head for best focus in the following manner. Turn on the "Show Cross" button. A blue cross should appear on the screen. Click the "Pattern" button repeatedly to project one of the several focusing patterns to aid in achieving the best focus. Select a pattern with a cross hair such as the one with the square. Adjust the focus control until the cross hair is aligned with the blue "cross" on the screen.
6. Adjust image brightness by changing the aperture on the lens through the hole in the side of the projector head and/or altering the camera gains setting on the screen. When the illumination is optimum, the red circle at the bottom of the screen labeled "I.O." will turn green.
7. Select technical surface/rough measurement type.
8. Click on the "Measure" button. When keeping the sample still in order to avoid blurring of the captured image.
9. To move the data into the analysis portion of the software, click on the clipboard/man icon.
10. Click on the icon "Draw Cutting Lines." On the captured image, "draw" six cutting lines (randomly selected) that extend from the center of a positive embossment through the center of a negative embossment to the center of another positive embossment. Click on the icon "Show Sectional Line Diagram." Make sure active line is set to line 1. Move the cross-hairs to the lowest point on the left side of the computer screen image and click the mouse. Then move the cross-hairs to the lowest point on the right side of the computer screen image on the current line and click the mouse. Click on the "Align" button by marked point's icon. Click the mouse on the lowest point on this line and then click the mouse on the highest point of the line. Click the "Vertical" distance icon. Record the distance measurement. Increase the active line to the next line, and repeat the previous steps until all six lines have been measured. Perform this task for four sheets equally spaced throughout the Finished Product Roll, and four finished product rolls for a total of 16 sheets or 96 recorded height values.

Take the average of all recorded numbers and report in mm, or µm, as desired. This number is the embossment height.

Wet Burst Strength Method

"Wet Burst Strength" as used herein is a measure of the ability of a fibrous structure and/or a paper product incorporating a fibrous structure to absorb energy, when wet and subjected to deformation normal to the plane of the fibrous structure and/or paper product. Wet burst strength may be measured using a Thwing-Albert Burst Tester Cat. No. 177 equipped with a 2000 g load cell commercially available from Thwing-Albert Instrument Company, Philadelphia, Pa.

For 1-ply and 2-ply products having a sheet length (MD) of approximately 11 inches (280 mm) remove two usable units from the roll. Carefully separate the usable units at the perforations and stack them on top of each other. Cut the usable units in half in the Machine Direction to make a sample stack of four usable units thick. For usable units smaller than 11 inches (280 mm) carefully remove two strips of three usable units from the roll. Stack the strips so that the perforations and edges are coincident. Carefully remove equal portions of each of the end usable units by cutting in the cross direction so that the total length of the center unit plus the remaining portions of the two end usable units is approximately 11 inches (280 mm). Cut the sample stack in half in the machine direction to make a sample stack four usable units thick.

The samples are next oven aged. Carefully attach a small paper clip or clamp at the center of one of the narrow edges. "Fan" the other end of the sample stack to separate the towels which allows circulation of air between them. Suspend each sample stack by a clamp in a 221° F.±2° F. (105° C.±1° C.) forced draft oven for five minutes ±10 seconds. After the heating period, remove the sample stack from the oven and cool for a minimum of 3 minutes before testing. Take one sample strip, holding the sample by the narrow cross machine direction edges, dipping the center of the sample into a pan filled with about 25 mm of distilled water. Leave the sample in the water four (4) (±0.5) seconds. Remove and drain for three (3) (±0.5) seconds holding the sample so the water runs off in the cross machine direction. Proceed with the test immediately after the drain step. Place the wet sample on the lower ring of a sample holding device of the Burst Tester with the outer surface of the sample facing up so that the wet part of the sample completely covers the open surface of the sample holding ring. If wrinkles are present, discard the samples and repeat with a new sample. After the sample is properly in place on the lower sample holding ring, turn the switch that lowers the upper ring on the Burst Tester. The sample to be tested is now securely gripped in the sample holding unit. Start the burst test immediately at this point by pressing the start button on the Burst Tester. A plunger will begin to rise toward the wet surface of the sample. At the point when the sample tears or ruptures, report the maximum reading. The plunger will automatically reverse and return to its original starting position. Repeat this procedure on three (3) more samples for a total of four (4) tests, i.e., four (4) replicates. Report the results as an average of the four (4) replicates, to the nearest g.

All documents cited in the Detailed Description of the Invention are, in relevant part, incorporated by reference herein; the citation of any document is not to be construed as an admission that it is prior art with respect to the present invention. To the extent that any meaning or definition of the term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A web product including one or more plies, the web product having a first side and a second side, the web product including:
   a plurality of discrete embossments extending from the first side to the second side;
   a plurality of linear embossments extending from the second side to the first side, wherein the web product has an average embossment height of greater than about 650 µm; and
   wherein the plurality of discrete embossments are arranged in a first non-random pattern and the web includes a plurality of linear embossments in a second non-random pattern, wherein the discrete embossments and the linear embossments are arranged such that at least one of the linear embossments is separated from every other linear embossment by at least one discrete embossment
   wherein at least one of the linear embossments has a first width and a second width, wherein the first width is smaller than the second width and provides a space in which at least one discrete embossment is disposed.

2. The web product of claim 1 wherein the discrete embossing elements are generally circular or oval in shape.

3. The web product of claim 1, wherein at least one linear embossing element has a length dimension and a width dimension and the ratio of the length dimension to the width dimension is at least about 4:1.

4. The web product of claim 1 wherein the web product includes at least two adjacent linear embossments each with a first width and a second width, wherein the first width is smaller than the second width and the linear embossments are aligned such that the first width of one of the at least two adjacent linear embossments and the first width of the second of the at least two linear embossments together provide a space in which at least one discrete embossment is disposed.

5. The web product of claim 1, wherein every linear embossment is separated from every other linear embossment by at least one discrete embossment.

6. The web product of claim 1 including a plurality of linear embossments having at least partially enclosed regions, wherein at least one discrete embossment is disposed within each of the at least partially enclosed regions of the linear embossments.

7. The web product of claim 5, wherein the at least one linear embossment includes an at least partially enclosed region which includes at least one discrete embossment disposed within the at least partially enclosed region of the linear embossment.

8. The web product of claim 5 including a plurality of linear embossments having at least partially enclosed regions, wherein at least one discrete embossment is disposed within each of the at least partially enclosed regions of the linear embossments.

9. The web product of claim 1 wherein the web includes at least one ply of paper having an unembossed wet burst strength and a finished product wet burst strength of greater than about 60% of the unembossed wet burst strength.

10. The web product of claim 1 where the web product has an average embossment height of greater than about 1000 µm.

11. The web product of claim 1 where the web product has an average embossment height of greater than about 1250 µm.

12. The web product of claim 1 where the web product has an average embossment height of greater than about 1450 µm.

13. The web product of claim 1 wherein the web product is a paper product.

14. The web product of claim 1 wherein the web product is a tissue towel paper product.

15. A web product including one or more plies, the web product having a first side and a second side, the web product including:
   a plurality of discrete embossments extending from the first side to the second side;
   a plurality of linear embossments extending from the second side to the first side, wherein the web product has an average embossment height of greater than about 650 µm; and
   wherein the plurality of discrete embossments are arranged in a first non-random pattern and the web includes a plurality of linear embossments in a second non-random pattern, wherein the discrete embossments and the linear embossments are arranged such that at least one of the linear embossments is separated from every other linear embossment by at least one discrete embossment
   wherein the at least one linear embossment includes an at least partially enclosed region which includes at least one discrete embossment disposed within the at least partially enclosed region of the linear embossment.

16. The web product of claim 15 including a plurality of linear embossments having at least partially enclosed regions, wherein at least one discrete embossment is disposed within each of the at least partially enclosed regions of the linear embossments.

17. The web product of claim 15 wherein the discrete embossing elements are generally circular or oval in shape.

18. The web product of claim 15, wherein at least one linear embossing element has a length dimension and a width dimension and the ratio of the length dimension to the width dimension is at least about 4:1.

19. The web product of claim 15 wherein the web includes at least one ply of paper having an unembossed wet burst strength and a finished product wet burst strength of greater than about 60% of the unembossed wet burst strength.

20. The web product of claim 15 where the web product has an average embossment height of greater than about 1000 µm.

21. The web product of claim 15 wherein the web product is a tissue towel paper product.

* * * * *